US011117575B2

(12) United States Patent
Irie et al.

(10) Patent No.: US 11,117,575 B2
(45) Date of Patent: Sep. 14, 2021

(54) DRIVING ASSISTANCE CONTROL SYSTEM OF VEHICLE

(71) Applicants: TOYOTA JIDOSHA KABUSHIKI KAISHA, Toyota (JP); DENSO CORPORATION, Kariya (JP)

(72) Inventors: Ryo Irie, Okazaki (JP); Yoji Kunihiro, Susono (JP); Hisaya Akatsuka, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 165 days.

(21) Appl. No.: 16/167,660

(22) Filed: Oct. 23, 2018

(65) Prior Publication Data

US 2019/0135279 A1    May 9, 2019

(30) Foreign Application Priority Data

Nov. 6, 2017  (JP) .............................. JP2017-214070

(51) Int. Cl.
*B60W 30/12*    (2020.01)
*G06K 9/62*    (2006.01)
(Continued)

(52) U.S. Cl.
CPC ......... *B60W 30/12* (2013.01); *G06K 9/00798* (2013.01); *G06K 9/627* (2013.01); *G08G 1/167* (2013.01); *G06N 20/00* (2019.01)

(58) Field of Classification Search
CPC ... B60W 30/12; G06K 9/00798; G06K 9/627; G08G 1/167; G06N 20/00
See application file for complete search history.

(56) References Cited

U.S. PATENT DOCUMENTS

| 2004/0098197 A1 | 5/2004 | Matsumoto et al. |
| 2014/0074388 A1* | 3/2014 | Bretzigheimer ....... B62D 6/006 |
| | | 701/117 |

(Continued)

FOREIGN PATENT DOCUMENTS

| JP | 5-92731 A | 4/1993 |
| JP | 2004-168192 A | 6/2004 |

(Continued)

*Primary Examiner* — Navid Ziaeianmehdizadeh
*Assistant Examiner* — Sean P Quinn
(74) *Attorney, Agent, or Firm* — Sughrue Mion, PLLC

(57) ABSTRACT

A driving assistance control system of a vehicle includes a needed information acquisition unit configured to acquire needed information for calculating a target path, a target path deciding unit configured to decide the target path based on the needed information, a vehicle traveling controller configured to perform a path following control for controlling a traveling device of the vehicle such that the vehicle follows the target path, and a system limit identification unit configured to identify a likelihood of reaching a system limit at which the path following control becomes unsuccessful. The system limit identification unit includes a determination model that learns a relationship between a plurality of vehicle feature amounts and the likelihood of reaching the system limit by machine learning in advance, and outputs an identification result of the likelihood of reaching the system limit corresponding to the input vehicle feature amounts using the determination model.

17 Claims, 19 Drawing Sheets

(51) Int. Cl.
    *G06K 9/00*     (2006.01)
    *G08G 1/16*     (2006.01)
    *G06N 20/00*    (2019.01)

(56) References Cited

U.S. PATENT DOCUMENTS

| | | | |
|---|---|---|---|
| 2015/0197248 A1* | 7/2015 | Breed | G08G 1/167 |
| | | | 701/93 |
| 2017/0186322 A1* | 6/2017 | Bonarens | B60W 30/12 |
| 2018/0105171 A1* | 4/2018 | Tsuji | B60W 10/18 |
| 2018/0345967 A1* | 12/2018 | Oniwa | B60W 10/04 |
| 2019/0064823 A1* | 2/2019 | Jiang | B60W 50/0205 |
| 2019/0155290 A1* | 5/2019 | Luo | B60W 30/00 |
| 2019/0317499 A1* | 10/2019 | Imai | B60W 30/146 |
| 2020/0094829 A1* | 3/2020 | Ohmura | B60W 40/04 |

FOREIGN PATENT DOCUMENTS

| | | |
|---|---|---|
| JP | 2010-247571 A | 11/2010 |
| JP | 2015-141560 A | 8/2015 |

* cited by examiner

FIG. 10
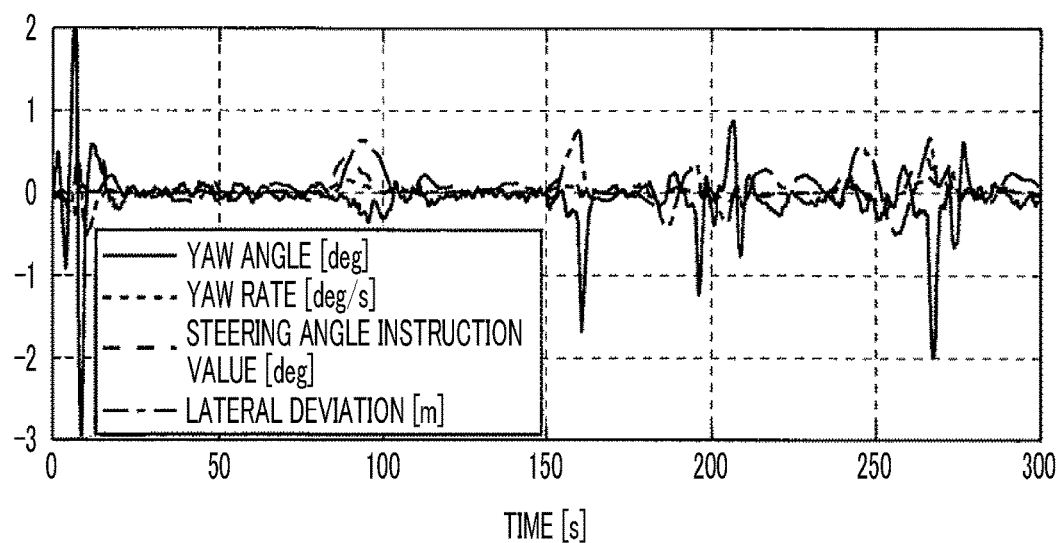
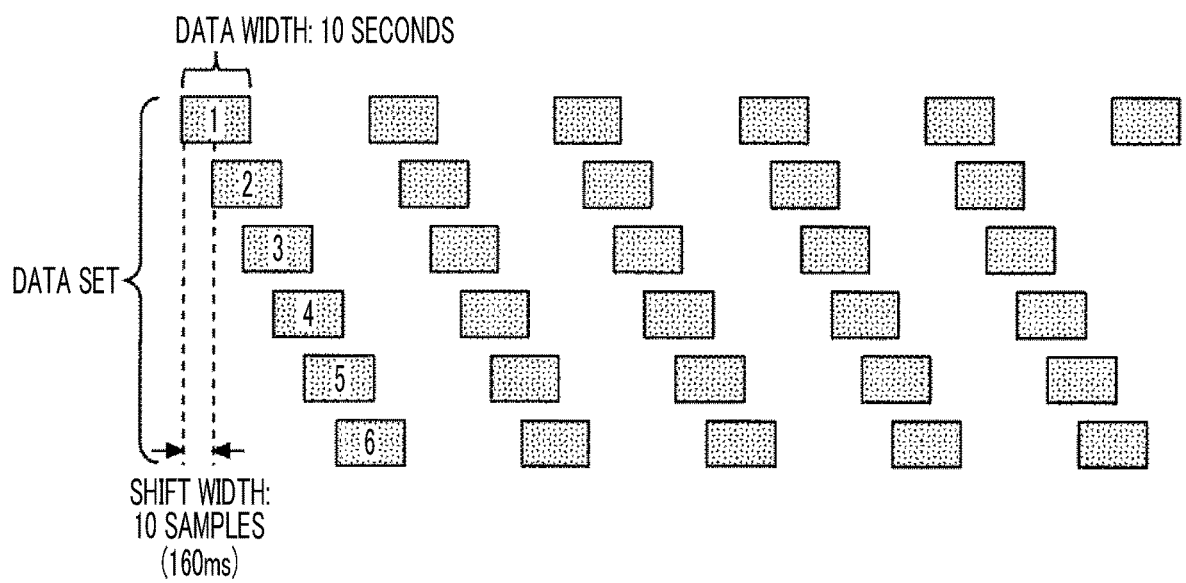

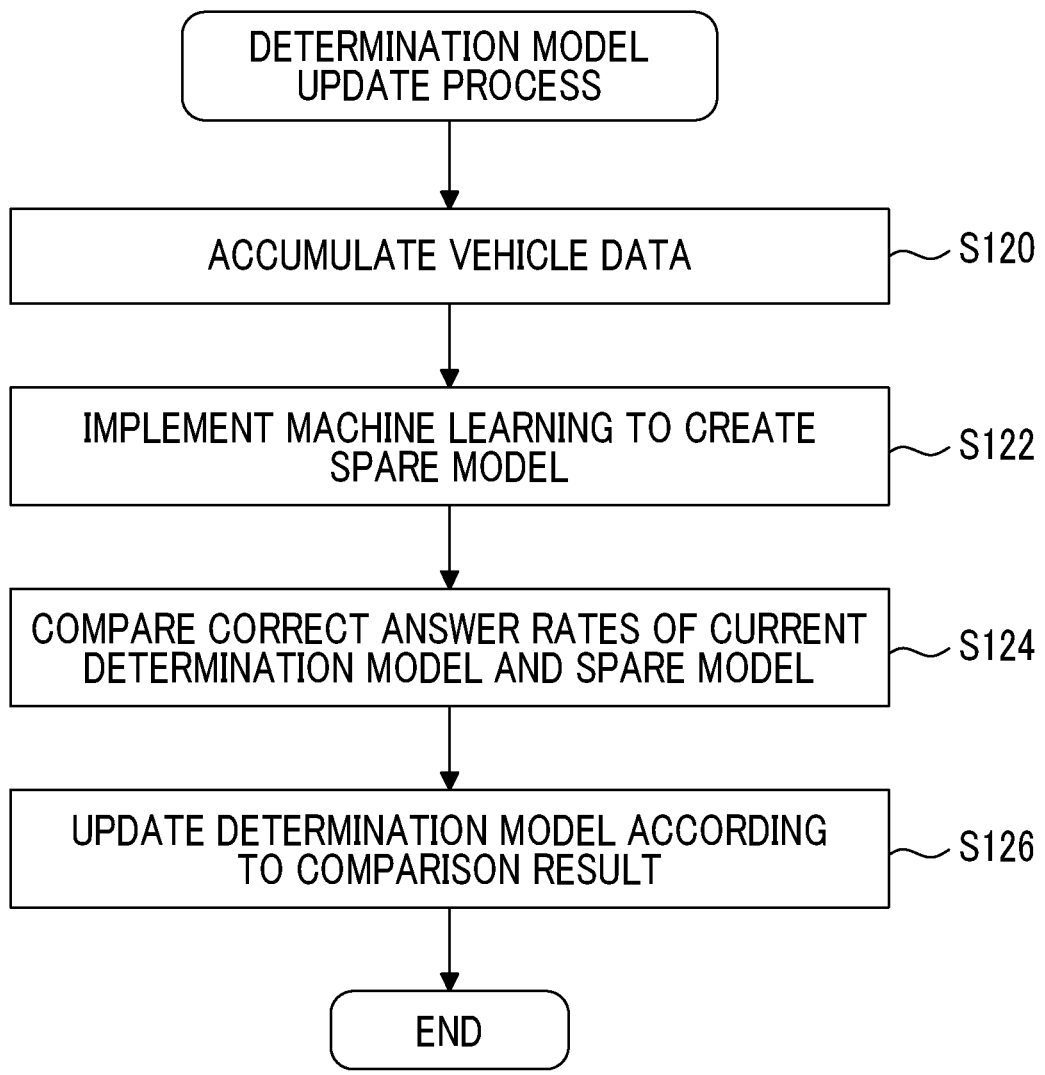

DRIVING ASSISTANCE CONTROL SYSTEM OF VEHICLE

INCORPORATION BY REFERENCE

The disclosure of Japanese Patent Application No. 2017-214070 filed on Nov. 6, 2017 including the specification, drawings and abstract is incorporated herein by reference in its entirety.

BACKGROUND

1. Technical Field

The disclosure relates to a driving assistance control system of a vehicle, and particularly to a driving assistance control system that controls traveling of a vehicle so as to follow a target path.

2. Description of Related Art

Japanese Unexamined Patent Application Publication No. 2004-168192 (JP 2004-168192 A) discloses a technique relating to a lane departure prevention device to restrain a host vehicle from departing from a traveling lane. In the technique, when a determination is made that the host vehicle may depart from the traveling lane with no operation of a direction indicator by a driver, a determination is made whether the departure is intended by the driver. Specifically, a lateral displacement estimate value from the traveling lane center after a predetermined gaze time is calculated using a yaw angle with respect to the traveling lane of the host vehicle, lateral displacement from the traveling lane center, a curvature of the traveling lane, and a vehicle speed of the host vehicle. When the lateral displacement estimate value is equal to or larger than a predetermined value, the host vehicle is determined to be in a lane departure state.

SUMMARY

In a path following control for causing a vehicle to travel so as to follow a target path, a target trajectory including time point information is calculated from the target path not including the time point information and a speed plan of the vehicle to control the vehicle according to the target trajectory. During autonomous driving in which the vehicle automatically travels by the path following control as described above, drive, braking, and steering of the vehicle are automatically controlled so as to follow the target path even when the vehicle departs from the target path due to a disturbance or the like.

However, for example, when a disturbance that reaches a limit of the control by the autonomous driving is applied to the vehicle, a situation where the vehicle cannot be controlled so as to follow the target path is assumed. In the following description, a limit of a system at which the autonomous driving control as described above becomes unsuccessful is referred to as a system limit. When the system limit is reached, a case where driving switching from the autonomous driving to manual driving is needed is also assumed. The system may determine in advance a likelihood of reaching the system limit considering a time for the driver to recognize and determine the need for the manual driving.

However, the determination of the likelihood of reaching the system limit is not easy. That is, the determination of the lane departure state in the related art is not assumed that a following control to the target path is performed. Thus, in a system in which the following control to the target path is performed, when the determination method in the related art is employed, the system may erroneously determine that the system limit is reached even when the system limit is not reached. As described above, when the related art is employed in the following control to the target path, there is a problem that the determination of the likelihood of reaching the system limit becomes too sensitive.

The disclosure accurately determines a likelihood of reaching a system limit at which a path following control becomes unsuccessful in a driving assistance control system of a vehicle that performs the path following control for controlling traveling of a vehicle so as to follow a target path.

A first aspect of the disclosure relates to a driving assistance control system of a vehicle. The driving assistance control system includes a needed information acquisition unit, a target path deciding unit, a vehicle traveling controller, and a system limit identification unit. The needed information acquisition unit is configured to acquire needed information for calculating a target path. The target path deciding unit is configured to decide the target path based on the needed information. The vehicle traveling controller is configured to perform a path following control for controlling a traveling device of the vehicle such that the vehicle follows the target path. The system limit identification unit configured to identify a likelihood of reaching a system limit at which the path following control becomes unsuccessful. The system limit identification unit includes a determination model that learns a relationship between a plurality of vehicle feature amounts related to the path following control and the likelihood of reaching the system limit by machine learning in advance. The system limit identification unit is configured to output an identification result of the likelihood of reaching the system limit corresponding to the input vehicle feature amounts using the determination model.

In the driving assistance control system according to the first aspect of the disclosure, the vehicle traveling controller may include an instruction value calculation unit configured to calculate an instruction value to the traveling device of the vehicle for the vehicle to follow the target path and an instruction value correction unit configured to correct the instruction value according to the identification result.

In the driving assistance control system according to the first aspect of the disclosure, the target path deciding unit may include a target path calculation unit configured to calculate the target path based on the needed information and a target path correction unit configured to correct the target path according to the identification result.

In the driving assistance control system according to the first aspect of the disclosure, the vehicle traveling controller may further include an alarm unit configured to alarm a driver when the identification result exceeds a predetermined threshold value.

In the driving assistance control system according to the first aspect of the disclosure, the vehicle traveling controller may be configured to end the path following control when a state where the identification result exceeds the predetermined threshold value continues for a certain period.

The driving assistance control system according to the first aspect of the disclosure may further include an update process unit configured to update the determination model. The update process unit may be configured to include an accumulation unit configured to accumulate past data of the vehicle feature amount, a spare model creation unit configured to create a spare model of the determination model by machine learning a relationship between the past data and the likelihood of reaching the system limit, a model comparison unit configured to compare a correct answer rate of an identification result by the determination model with a correct answer rate of an identification result by the spare model using test data, and a determination model update unit configured to update the determination model with the spare model when the correct answer rate of the spare model is higher than the correct answer rate of the determination model by a certain level or more.

In the driving assistance control system according to the first aspect of the disclosure, the system limit identification unit may be configured not to output the identification result when a predetermined confirmation condition is not established.

With the driving assistance control system according to the first aspect of the disclosure, the likelihood of reaching the system limit in the path following control is identified using the determination model learned by the machine learning in advance. Accordingly, it is possible to accurately identify a sign of reaching the system limit before the system limit is actually reached.

Further, with the driving assistance control system according to the first aspect of the disclosure, it is possible to correct the instruction value in the path following control according to the sign of reaching the system limit. Accordingly, it is possible to suppress that the system limit is reached.

Further, with the driving assistance control system according to the first aspect of the disclosure, it is possible to correct the target path in the path following control according to the sign of reaching the system limit. Accordingly, it is possible to suppress that the system limit is reached.

Further, with the driving assistance control system according to the first aspect of the disclosure, it is possible to alarm the driver that the system limit is reached before the system limit is actually reached. Accordingly, it is possible to ensure a time postponement for the driver to recognize and determine that the system limit is reached before the system limit is reached.

Further, with the driving assistance control system according to the first aspect of the disclosure, when the sign of reaching the system limit continues for a certain period, it is possible to end the path following control. Accordingly, it is possible to ensure the safety of the vehicle.

Further, with the driving assistance control system according to the first aspect of the disclosure, it is possible to update to the determination model having a higher correct answer rate. Accordingly, it is possible to accurately identify the likelihood of reaching the system limit according to a change in an external environment or the like due to aged deterioration of the vehicle or a seasonal change.

Further, with the driving assistance control system according to the first aspect of the disclosure, it is possible to suppress that an erroneous identification result regarding the likelihood of reaching the system limit is output.

According to the aspect of the disclosure, as described above, it is possible to provide the driving assistance control system capable of accurately determining the likelihood of reaching the system limit.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 10 is a diagram for describing a method of creating training data and test data;

FIG. 21 is a flowchart showing a determination model update process by the determination model update process unit according to the embodiment 6.

DETAILED DESCRIPTION OF EMBODIMENTS

Hereinafter, embodiments of the disclosure will be described with reference to drawings. However, when a numeral such as the number, quantity, amount, or range of each element is referred in the following embodiments, the referred numeral is not limited to the disclosure unless otherwise particularly stated or obviously specified by the numeral in principle. A structure, step, or the like described in the following embodiments is not necessarily indispensable to the disclosure unless otherwise particularly stated or obviously specified by the numeral in principle.

Embodiment 1

1-1. Configuration of Autonomous Driving System

Figure 1:
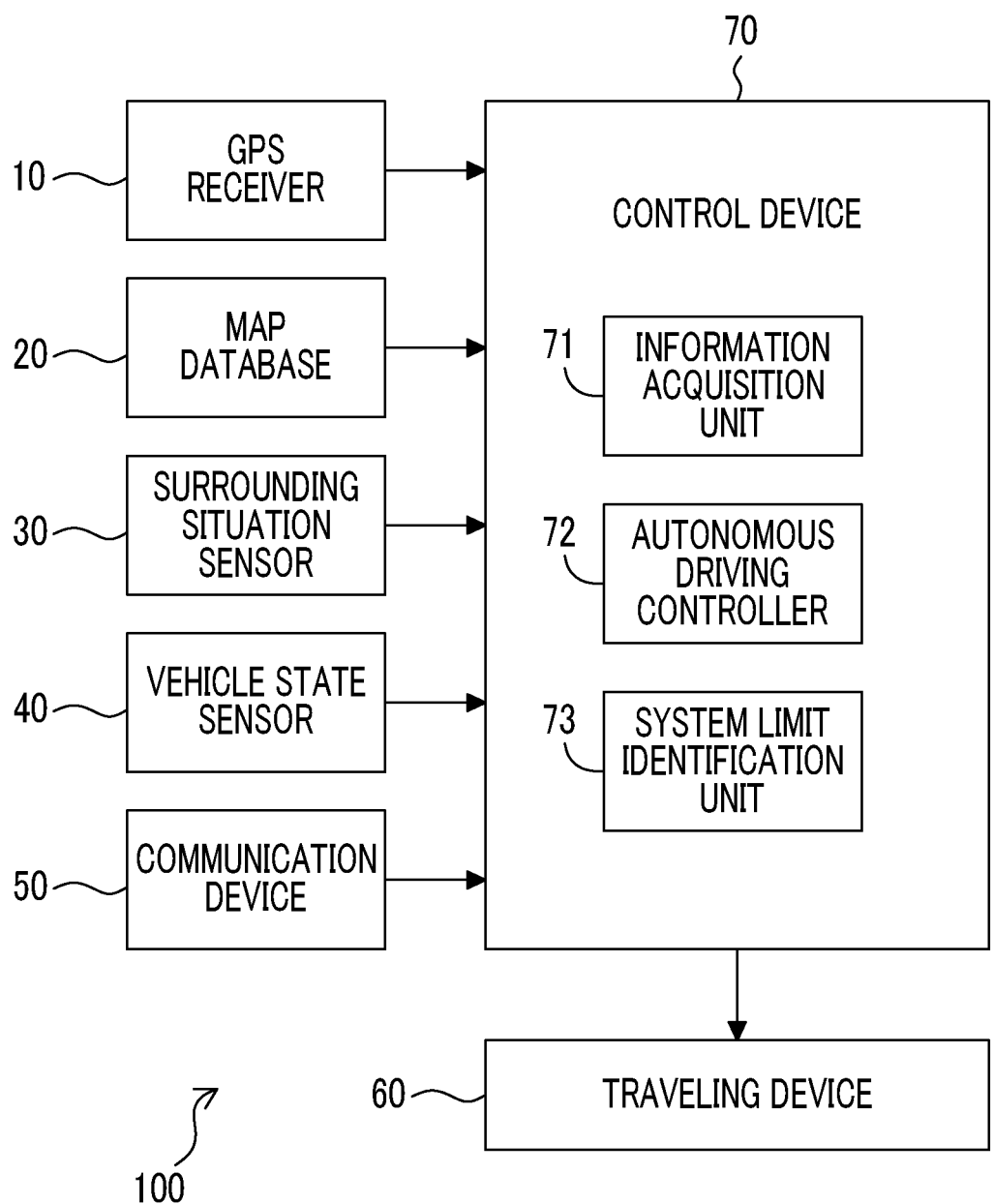
FIG. 1 is a block diagram showing a configuration of a driving assistance control system according to an embodiment 1.

FIG. 1 is a block diagram showing a configuration of a driving assistance control system according to an embodiment 1. A driving assistance control system 100 is mounted on a vehicle and controls autonomous driving of the vehicle. More specifically, the driving assistance control system 100 includes a global positioning system (GPS) receiver 10, a map database 20, a surrounding situation sensor 30, a vehicle state sensor 40, a communication device 50, a traveling device 60, and a control device 70.

The GPS receiver 10 receives signals transmitted from a plurality of GPS satellites and calculates a position and an orientation of the vehicle based on the received signals. The GPS receiver 10 transmits the calculated pieces of information to the control device 70.

Information indicating a boundary position of each lane on a map is recorded in advance in the map database 20. The boundary position of each lane is represented by a point group or a line group. The map database 20 is stored in a predetermined storage device.

The surrounding situation sensor 30 detects a situation around the vehicle. Examples of the surrounding situation sensor 30 are laser imaging detection and ranging (LIDAR), radar, and a camera. The LIDAR detects an object around the vehicle using light. The radar detects the object around the vehicle using a radio wave. The camera images the situation around the vehicle. The surrounding situation sensor 30 transmits the detected pieces of information to the control device 70.

The vehicle state sensor 40 detects a traveling state of the vehicle. Examples of the vehicle state sensor 40 are a vehicle speed sensor, a steering angle sensor, a yaw rate sensor, a lateral acceleration sensor, and a front-rear acceleration sensor. The vehicle speed sensor detects a speed of the vehicle. The steering angle sensor detects a steering angle of the vehicle. The yaw rate sensor detects a yaw rate of the vehicle. The lateral acceleration sensor detects lateral acceleration applied to the vehicle. The front-rear acceleration sensor detects front-rear acceleration applied to the vehicle. The vehicle state sensor 40 transmits the detected pieces of information to the control device 70.

The communication device 50 performs vehicle to everything (V2X) communication (vehicle-to-vehicle communication and road-to-vehicle communication). Specifically, the communication device 50 performs vehicle to vehicle (V2V) communication (vehicle-to-vehicle communication) with other vehicles. The communication device 50 performs vehicle-to-roadside-infrastructure (V2I) communication (road-to-vehicle communication) with surrounding infrastructures. The communication device 50 can acquire pieces of information relating to an environment around the vehicle through the V2X communication. The communication device 50 transmits the acquired pieces of information to the control device 70.

The traveling device 60 includes a steering device, a drive device, a braking device, a transmission, and the like. The steering device steers wheels. The drive device is a power source for generating drive force. Examples of the drive device are an engine and a motor. The braking device generates braking force. During execution of an autonomous driving control, the traveling device 60 is operated by an actuator. During manual driving by a driver, the traveling device 60 is controlled by the driver itself. Examples of the steering device, the drive device, and the braking device operated by the driver are a steering wheel, an accelerator pedal, and a brake pedal, respectively.

The control device 70 performs the autonomous driving control for controlling the autonomous driving of the vehicle. Typically, the control device 70 is a microcomputer including a processor, a storage device, and an input and output interface. The control device 70 is also referred to as an electronic control unit (ECU). The control device 70 receives various pieces of information through the input and output interface. The control device 70 performs the autonomous driving control based on the received pieces of information.

More specifically, the control device 70 includes an information acquisition unit 71, an autonomous driving controller 72, and a system limit identification unit 73 as function blocks. The function blocks are realized by the processor of the control device 70 executing a control program stored in the storage device. The control program may be stored in a computer-readable recording medium. The information acquisition unit 71 performs an information acquisition process. The autonomous driving controller 72 performs an autonomous driving control process. The system limit identification unit 73 performs a system limit identification process.

Figure 2:
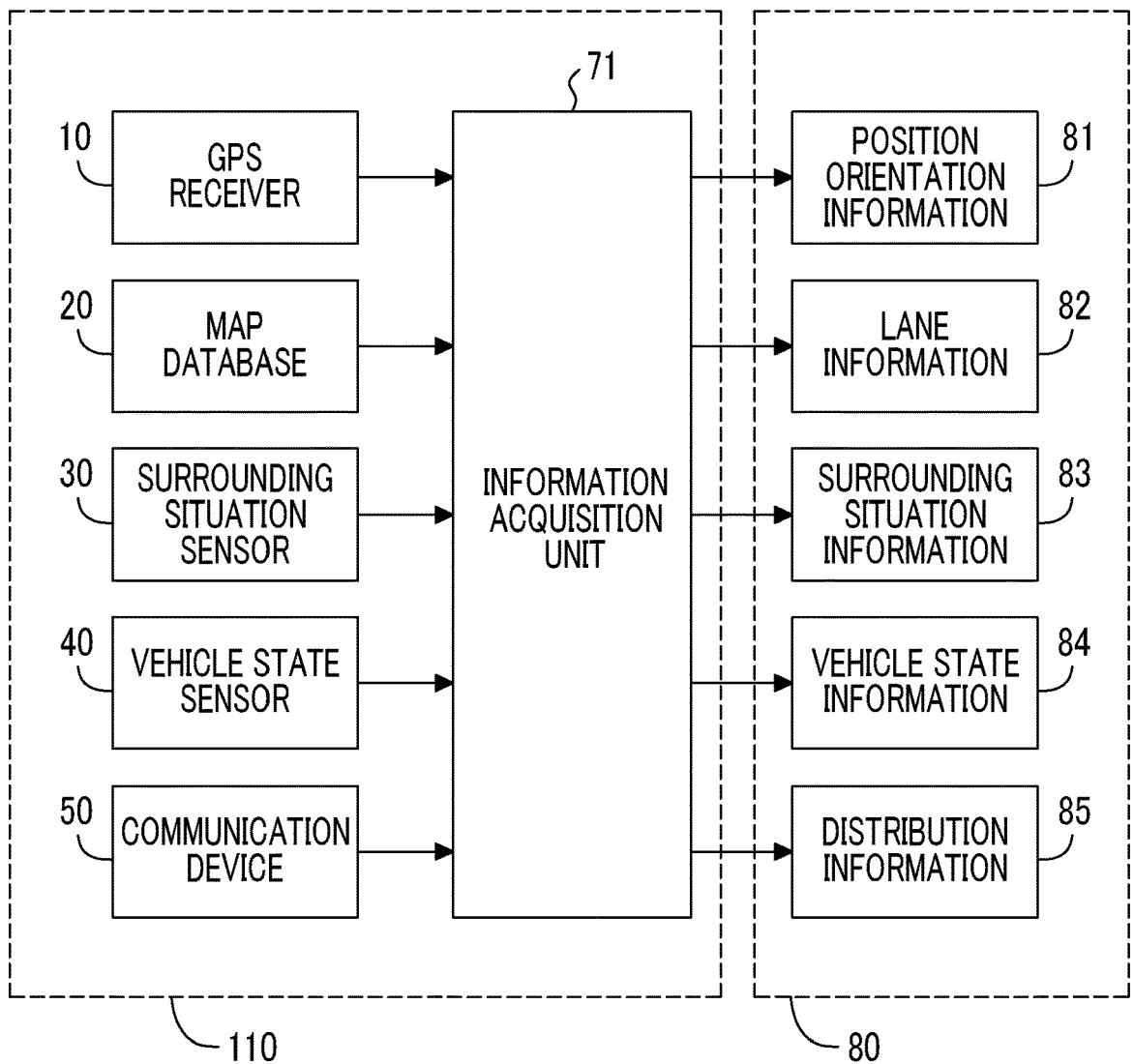
FIG. 2 is a block diagram for describing an information acquisition process according to the embodiment 1.

FIG. 2 is a block diagram for describing the information acquisition process according to the embodiment 1. In the information acquisition process, the information acquisition unit 71 acquires information needed for the autonomous driving control. The information acquisition process is repeatedly executed for a constant cycle.

More specifically, the information acquisition unit 71 acquires position orientation information 81 indicating a current position and the orientation of the vehicle from the GPS receiver 10. The position orientation information 81 is not limited to the method of calculating from the GPS receiver 10. That is, the position orientation information 81 may be calculated from a white line or a surrounding object recognized using the surrounding situation sensor 30 such as the radar or camera.

The information acquisition unit 71 reads information relating to the lane from the map database 20 to generate lane information 82. The lane information 82 includes a disposition (position, shape, inclination) of each lane on the map. The information acquisition unit 71 can grasp merging, branching, intersection, and the like of the lanes based on the lane information 82. The information acquisition unit 71 can calculate a lane curvature, a lane width and the like based on the lane information 82.

The information acquisition unit 71 generates surrounding situation information 83 based on the pieces of information detected by the surrounding situation sensor 30. The surrounding situation information 83 includes object information relating to the object around the vehicle. Examples of the object are the white line, a road side object, and a surrounding vehicle.

The information acquisition unit 71 generates vehicle state information 84 based on the pieces of information detected by the vehicle state sensor 40. The vehicle state information 84 includes the pieces of information such as the vehicle speed, the steering angle, the yaw rate, the lateral acceleration, and the front-rear acceleration.

The information acquisition unit 71 receives distribution information 85 through the communication by the communication device 50. The distribution information 85 is information distributed from the infrastructure or the surrounding vehicle. Examples of the distribution information 85 are construction section information and traffic accident information.

All the position orientation information 81, the lane information 82, the surrounding situation information 83, the vehicle state information 84, and the distribution information 85 exemplified above indicate a driving environment of the vehicle. The pieces of information indicating the driving environment of the vehicle as described above are referred to as "driving environment information 80". That is, the driving environment information 80 includes the position orientation information 81, the lane information 82, the surrounding situation information 83, the vehicle state information 84, and the distribution information 85.

The information acquisition unit 71 of the control device 70 can be said to have a function of acquiring the driving environment information 80. As shown in FIG. 2, the information acquisition unit 71 configures "information acquisition device 110" together with the GPS receiver 10, the map database 20, the surrounding situation sensor 30, the vehicle state sensor 40, and the communication device 50. The information acquisition device 110 performs the information acquisition process described above as a part of the driving assistance control system 100.

Figure 3:
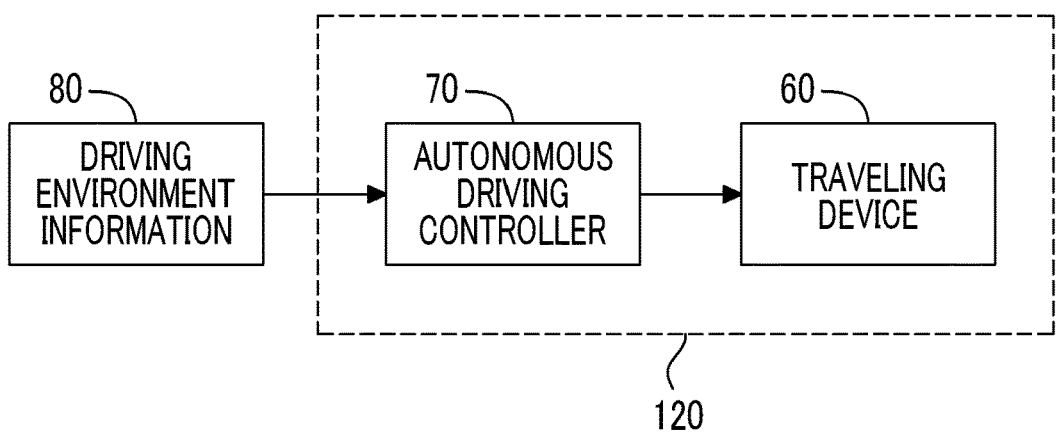
FIG. 3 is a block diagram for describing an autonomous driving control process according to the embodiment 1.

FIG. 3 is a block diagram for describing the autonomous driving control process according to the embodiment 1. The autonomous driving controller 72 performs the autonomous driving control based on the driving environment information 80. The autonomous driving controller 72 particularly performs a path following control as one of autonomous driving control. In the path following control, the autonomous driving controller 72 calculates a target path of the vehicle to control traveling of the vehicle so as to follow the target path. The traveling of the vehicle can be controlled by appropriately operating the traveling device 60.

The autonomous driving controller 72 and the traveling device 60 configure "path following control device 120". The path following control device 120 performs the path following control as a part of the driving assistance control system 100. Hereinafter, the path following control by the path following control device 120 according to the embodiment 1 will be described in more detail.

1-2. Path Following Control Device

Figure 4:
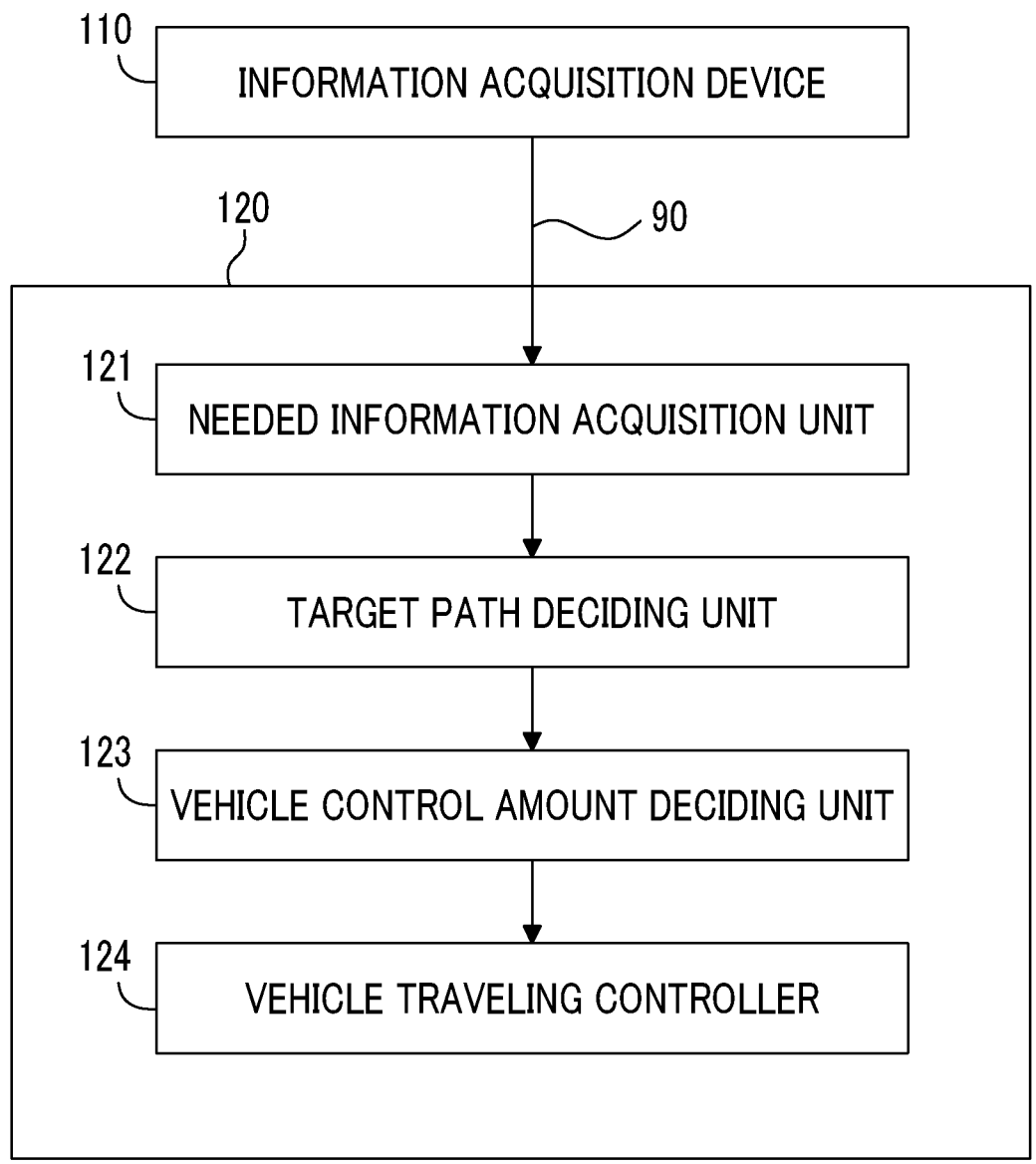
FIG. 4 is a block diagram showing a function configuration of a path following control device according to the embodiment 1.

FIG. 4 is a block diagram showing a function configuration of the path following control device according to the embodiment 1. The path following control device 120 includes a needed information acquisition unit 121, a target path deciding unit 122, a vehicle control amount deciding unit 123, and a vehicle traveling controller 124.

Figure 5:
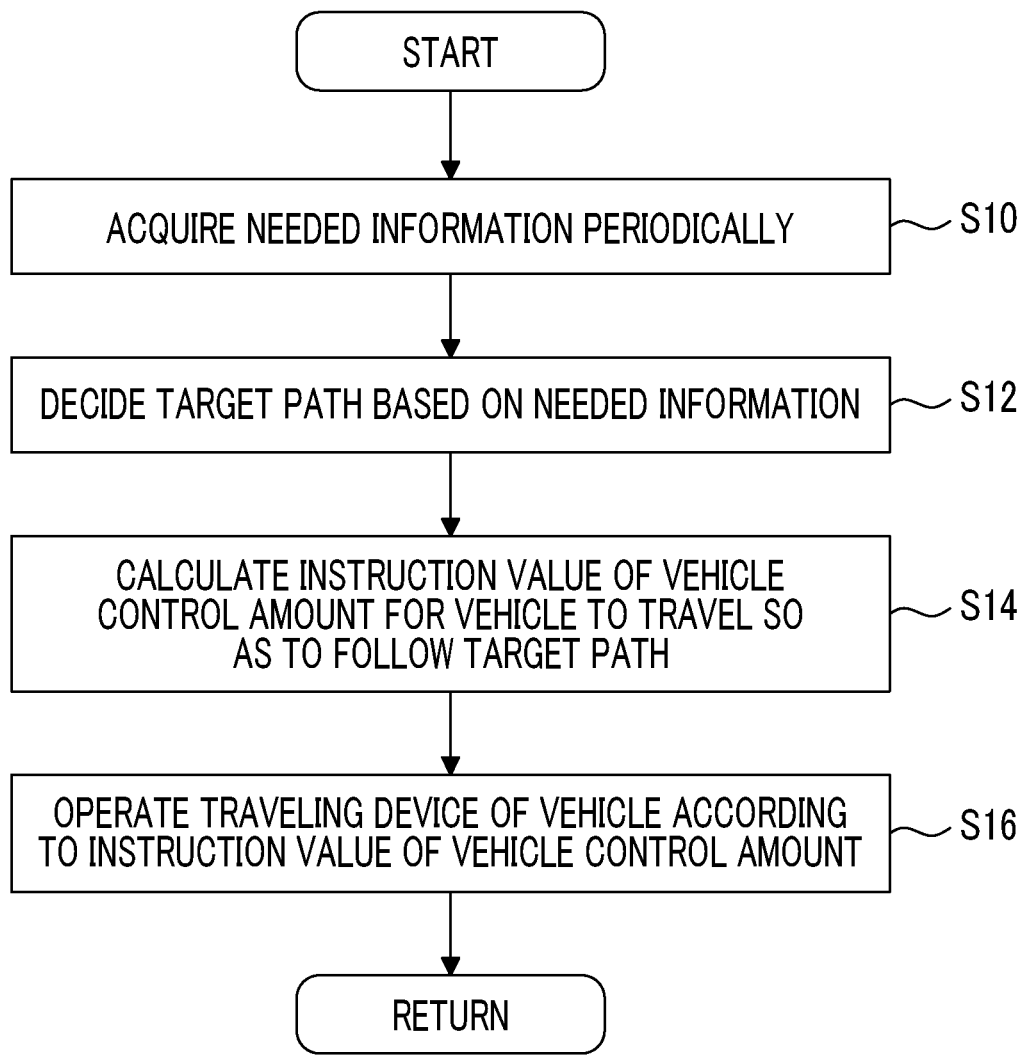
FIG. 5 is a flowchart showing a path following control by the path following control device according to the embodiment 1.

FIG. 5 is a flowchart showing the path following control by the path following control device according to the embodiment 1. The path following control by the path following control device 120 according to the embodiment 1 will be described with reference to FIGS. 4 and 5.

As shown in FIGS. 4 and 5, the needed information acquisition unit 121 periodically acquires needed information 90 through the information acquisition device 110 (step S10). The needed information 90 is information needed for the calculation of the target path and a part of the driving environment information 80. For example, the needed information 90 includes the position orientation information 81, the lane information 82, the surrounding situation information 83, and the distribution information 85. The needed information acquisition unit 121 periodically acquires the needed information 90 and outputs the acquired information to the target path deciding unit 122.

Next, the target path deciding unit 122 decides the target path based on the needed information 90 acquired in step S10 (step S12). Various methods of calculating the target path are suggested. The method of calculating the target path according to the embodiment 1 is not particularly limited. The target path deciding unit 122 outputs the decided target path to the vehicle control amount deciding unit 123.

The vehicle control amount deciding unit 123 calculates an instruction value of a vehicle control amount for the vehicle to travel so as to follow the target path (step S14). For example, the vehicle control amount deciding unit 123 calculates a steering angle instruction value, a vehicle speed instruction value, or the like for reducing a deviation between the vehicle and the target path based on parameters such as a lateral deviation, an orientation angle difference, and a curvature of the target path. The vehicle control amount deciding unit 123 outputs the decided instruction value to the vehicle traveling controller 124.

The vehicle traveling controller 124 operates the traveling device 60 according to the instruction value of the vehicle control amount output from the vehicle control amount deciding unit 123 (step S16). For example, the traveling device 60 includes an electric power steering (EPS) device configured to steer the wheels of the vehicle. It is possible to steer the wheels by driving and controlling a motor of the electric power steering device. The vehicle traveling controller 124 drives the motor according to the steering angle instruction value output from the vehicle control amount deciding unit 123. The path following control is realized as described above.

1-3. System Limit Identification Process

Features of the driving assistance control system 100 according to the embodiment 1 will be described. With the path following control, the traveling of the vehicle is controlled so as to follow the target path. However, in the middle of the path following control, for example, when a disturbance that exceeds a control limit of the path following control is applied to the vehicle, there may be a case where a system limit at which the path following control becomes unsuccessful is reached. Example of reaching the system limit as described above is that the vehicle departs from the lane, the vehicle separates a certain level or more from the target path, the vehicle speed separates a certain level or more from a target speed, the vehicle approaches a certain level or more the white line or a boundary of a travelable area, or a sensor value of the yaw angle or the like separates a certain level or more from a target value. In the case as described above, since the system needs to request the driver to switch the driving, it is significant to accurately identify in advance that the system limit is reached.

The system limit identification unit 73 performs the system limit identification process as a part of the driving assistance control system 100. Hereinafter, the system limit identification process according to the embodiment 1 will be described in more detail.

Figure 6:
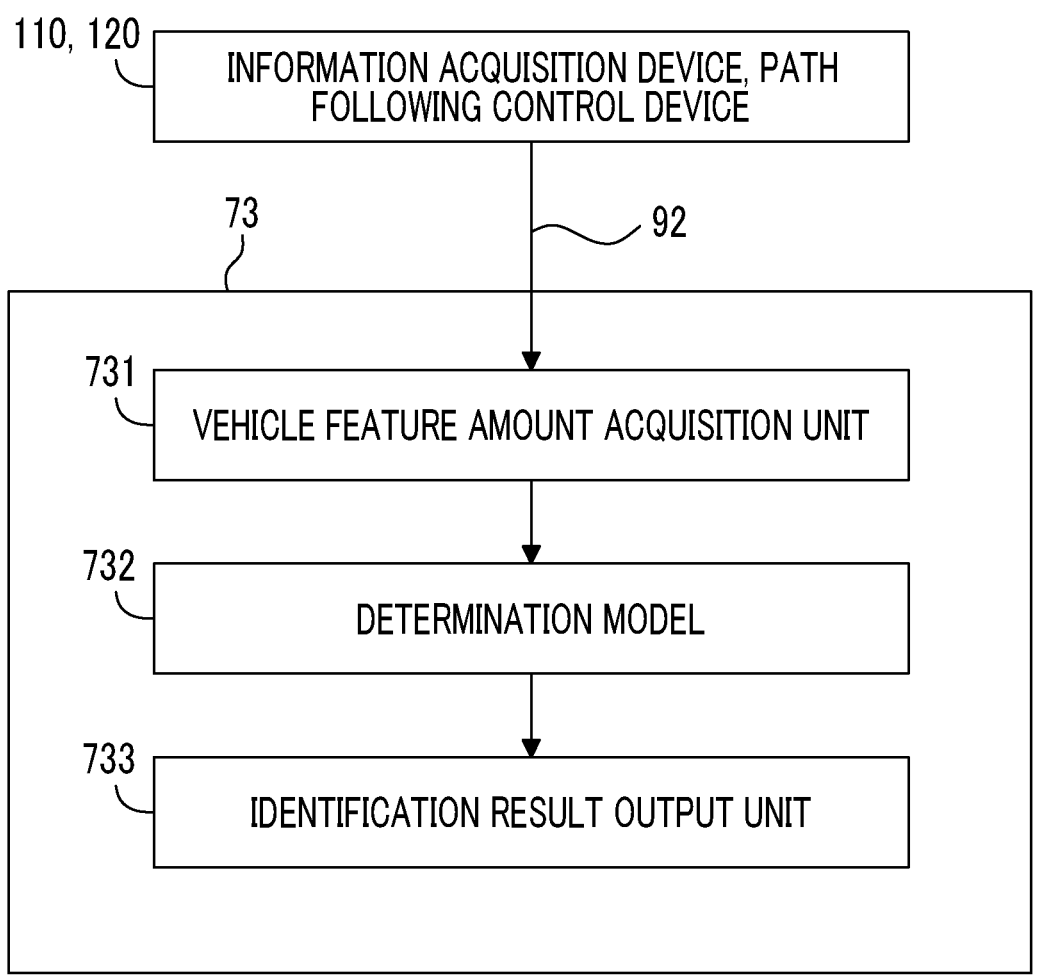
FIG. 6 is a block diagram showing a function configuration of a system limit identification unit according to the embodiment 1.

FIG. 6 is a block diagram showing a function configuration of the system limit identification unit according to the embodiment 1. The system limit identification unit 73 includes a vehicle feature amount acquisition unit 731, a determination model 732, and an identification result output unit 733.

Figure 7:
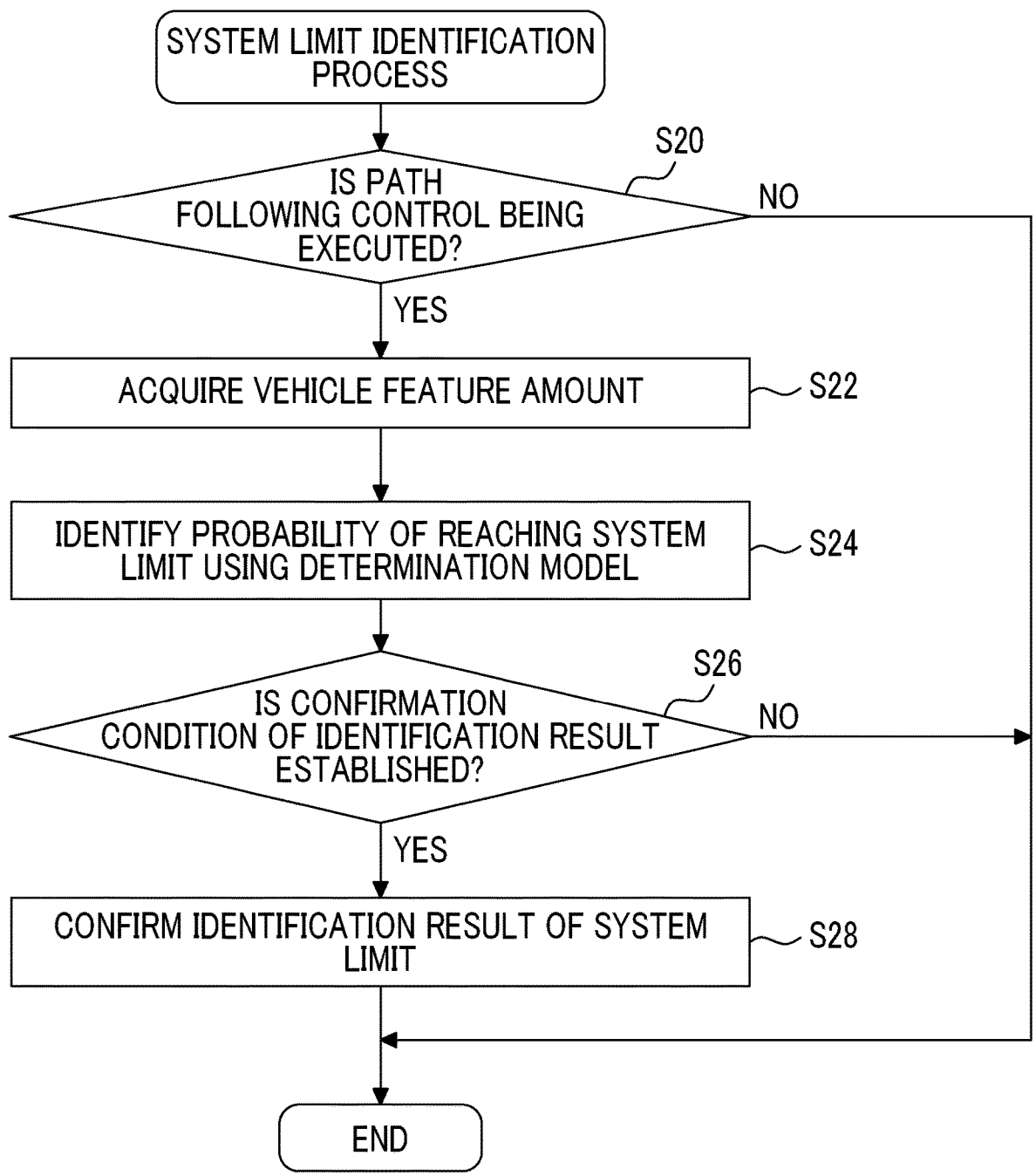
FIG. 7 is a flowchart showing a system limit identification process by the system limit identification unit according to the embodiment 1.

FIG. 7 is a flowchart showing the system limit identification process by the system limit identification unit according to the embodiment 1. The system limit identification process by the system limit identification unit 73 according to the embodiment 1 will be described with reference to FIGS. 6 and 7.

As shown in FIGS. 6 and 7, first, the system limit identification unit 73 determines whether the path following control is being executed (step S20). As a result of the determination, when the path following control is not being executed, the routine ends. When the path following control is being executed, the routine proceeds to the next step. In the next step, the vehicle feature amount acquisition unit 731 acquires a vehicle feature amount 92 (step S22). The vehicle feature amount 92 is a feature amount of the vehicle related to the path following control and is used for identifying the system limit. For example, the vehicle feature amount 92 includes at least any one of a lateral deviation between the vehicle and the target path, the steering angle, the vehicle speed, the vehicle yaw rate, the front-rear acceleration, the lateral acceleration, the steering angle instruction value, the vehicle speed instruction value, a vehicle yaw rate instruction value, a front-rear acceleration instruction value, a lateral acceleration instruction value, or a deviation between the instruction value and the sensor value. Specifically, the vehicle feature amount acquisition unit 731 acquires the vehicle feature amount 92 described above from the information acquisition device 110 or the path following control device 120. The vehicle feature amount acquisition unit 731 outputs the acquired vehicle feature amount 92 to the determination model 732.

The system limit identification unit 73 identifies a probability of reaching the system limit using the determination model 732 (step S24). Specifically, the system limit identification unit 73 inputs the acquired vehicle feature amount 92 to the determination model 732. The determination model 732 is a model configured to receive the input of the vehicle feature amount 92 and output the probability of reaching the system limit. In the determination model 732, a parameter or the number of intermediate layers of the model is adjusted by machine learning in advance such that a correct answer rate of an identification result exceeds a predetermined threshold value. Various methods such as a neural network, a support vector machine (SVM), and a k-nearest neighbor algorithm (k-NN) may be used as a learning algorithm of the determination model 732. In the following description, the neural network is used as the learning algorithm of the determination model 732 as an example. An example of a machine learning process of the determination model 732 will be described below for the machine learning process of the determination model 732. The determination model 732 outputs the probability of reaching the system limit to the identification result output unit 733.

The identification result output unit 733 determines whether a confirmation condition of the identification result is established (step S26). The confirmation condition is a condition for suppressing hunting or an erroneous determination of the identification result of the system limit. For example, the following conditions are used as the confirmation condition.

(1) An identification process of the system limit by the determination model 732 identifies the same identification result for a certain time. The condition is for suppressing the hunting of the identification result of the system limit.

The confirmation condition may be the following condition.

(2) All the following conditions (a) to (f) are established.
(a) The autonomous driving control is being executed.
(b-1) The driver does not steer the steering wheel or (b-2) There is no lane adjacent to a steering direction when the driver steers the steering wheel.
(c) The driving assistance control system 100 is in a normal state.
(d) The driver does not operate the brake pedal.
(e) The driver does not operate the accelerator pedal.
(f) The vehicle speed is equal to or less than a threshold value.

The condition (b-2) among the conditions is a condition for excluding when the lane is changed by the steering of the driver. The conditions (b-1), (c), and (d) are conditions for excluding when the following error occurs.

As a result of the determination in step S26, when the establishment of the determination is not approved, the routine ends. When the establishment of the determination is approved, the routine proceeds to the next step. In the next step, the identification result output unit 733 confirms and outputs the identification result output from the determination model 732 (step S28). The system limit identification process is realized as described above.

1-4. Machine Learning Process of Determination Model

The machine learning process of the determination model 732 included in the driving assistance control system 100 according to the embodiment 1 will be described. In the determination model 732, the machine learning process using the neural network is performed in advance to correlate the vehicle feature amount with the probability of reaching the system limit. Hereinafter, the machine learning process of the determination model 732 will be described in more detail along a flowchart.

Figure 8:
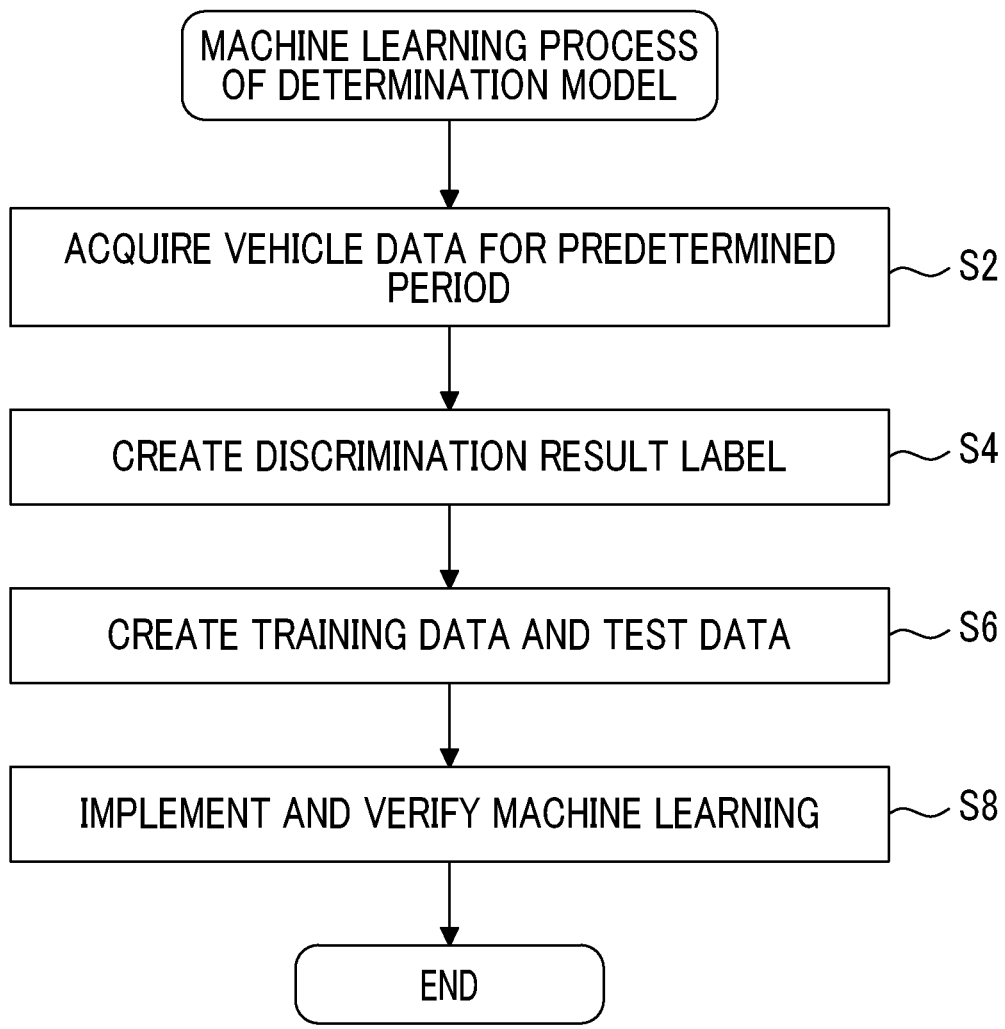
FIG. 8 is a flowchart of a routine executed when a machine learning process of a determination model is performed.

FIG. 8 is a flowchart of a routine executed when the machine learning process of the determination model is performed. In the machine learning process shown in FIG. 8, first, vehicle data for a predetermined period during execution of the path following control is acquired (step S2). Examples of the vehicle data herein are the lateral deviation between the vehicle and the target path, the steering angle, the vehicle speed, the vehicle yaw rate, the front-rear acceleration, the lateral acceleration, the steering angle instruction value, the vehicle speed instruction value, the vehicle yaw rate instruction value, the front-rear acceleration instruction value, and the lateral acceleration instruction value.

Figure 9:
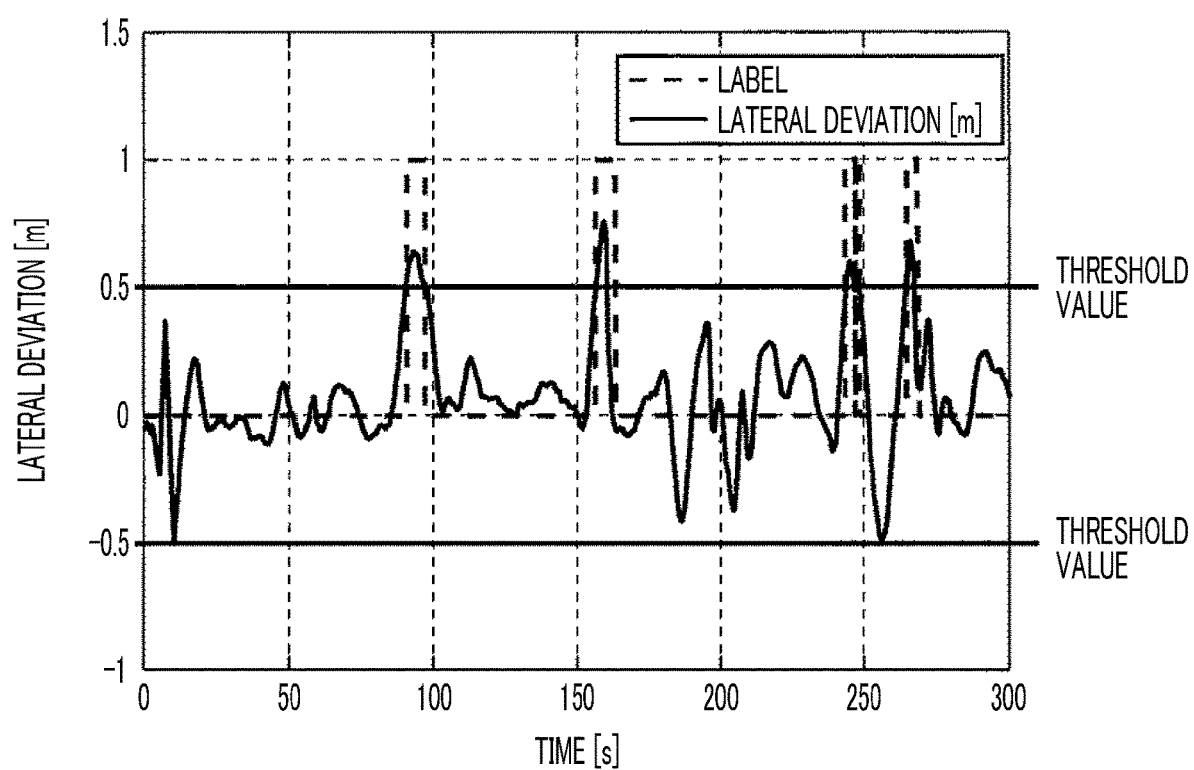
FIG. 9 is a graph for describing a method of creating a discrimination result label.

A discrimination result label representing discrimination results when the vehicle can keep the lane and when the vehicle departs from the lane is created (step S4). FIG. 9 is a graph for describing a method of creating the discrimination result label. As shown in FIG. 9, the discrimination result label is one when a lateral deviation acquired in step S2 exceeds a threshold value, and the discrimination result label is zero when the lateral deviation does not exceed the threshold value. Here, learning with a teacher who creates the discrimination result label is described as an example, but a learning method not creating the discrimination result label (for example, one class support vector machine (SVM) or autoencoder) may be used.

Training data and test data for the machine learning are created (step S6). The training data is data used for the machine learning of the determination model, and the test data is data used for evaluating the determination model on which the machine learning is performed. FIG. 10 is a diagram for describing a method of creating the training data and the test data. In the above steps, the vehicle data acquired in step S2 and the discrimination result label created in step S4 are divided into a plurality of pieces of data having a predetermined data width and shifted by a predetermined shift width. The data width corresponds to a time needed for the determination, and the shift width corresponds to a calculation cycle. Here, the data width is 10 seconds, and the shift width is 160 milliseconds. For example, a part of the data is used as the training data, and the remaining is used as the test data.

Figure 11:
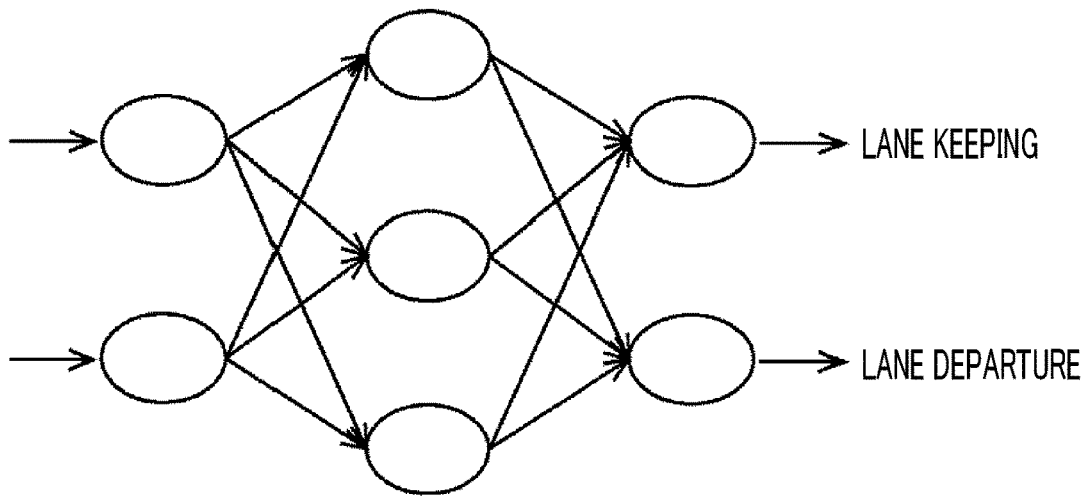
FIG. 11 is a diagram for describing a method of machine learning using a neural network.

The machine learning is implemented and verified using the created training data and test data (step S8). Here, the machine learning is performed using the neural network as a representative learning algorithm of the machine learning. FIG. 11 is a diagram for describing a method of the machine learning using the neural network. As shown in FIG. 11, the neural network is configured of an input layer, the intermediate layer, and an output layer. The training data divided in step S6 is input to the input layer. The output from the output layer is performed when the vehicle can keep the lane and when the vehicle departs from the lane. The output from the output layer may be a probability of departing from the lane, that is, the probability of reaching the system limit. A neuron is learned, for example, using a gradient descent method as a sigmoid function. The parameters such as increase or decrease of the number of pieces of data, normalization of the input, and the number of intermediate layers are adjusted before the correct answer rate of the identification result using the test data exceeds the predetermined threshold value. The machine learning of the determination model 732 is performed by the method described above.

1-5. Modification Example of Embodiment 1

The driving assistance control system 100 according to the embodiment 1 may be configured as a modified system as described below.

The system limit identification unit 73 may be configured inside a management server communicable with the vehicle. In the case described above, the vehicle feature amount 92 may be transmitted from a vehicle side to the management server, a likelihood of reaching the system limit may be identified in the management server, and the identification result may be transmitted from the management server to the vehicle.

The identification result output from the system limit identification unit 73 is not limited to the probability of reaching the system limit, but may be whether the system limit is reached.

An establishment determination of the confirmation condition of the identification result performed by the identification result output unit 733 is not indispensable.

Embodiment 2

A driving assistance control system according to an embodiment 2 will be described.

2-1. Feature of Embodiment 2

The driving assistance control system 100 according to the embodiment 2 has a feature of an alarm process of alarming the driver when the system limit is likely to be reached. An alarm controller 140 performs the alarm process as a part of the driving assistance control system 100. Hereinafter, the alarm process according to the embodiment 2 will be described in more detail.

Figure 12:
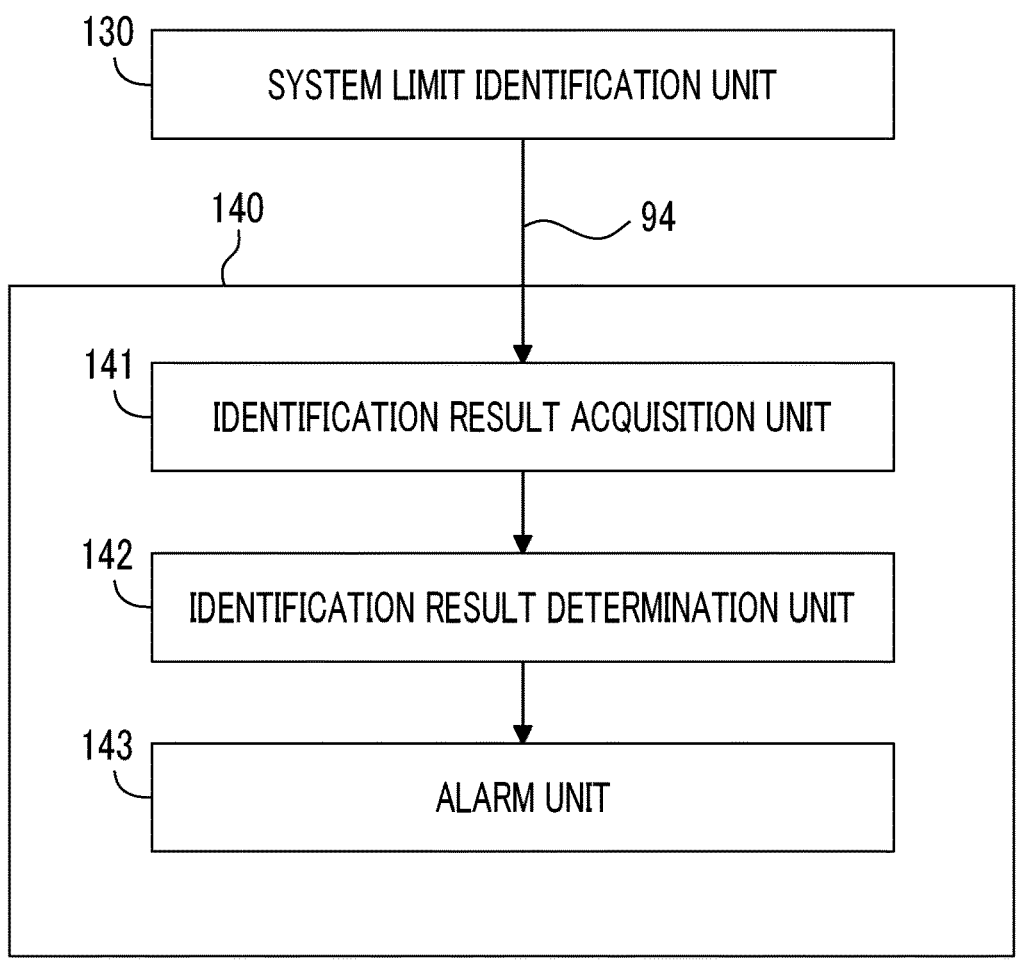
FIG. 12 is a block diagram showing a function configuration of an alarm controller according to an embodiment 2.
Figure 13:
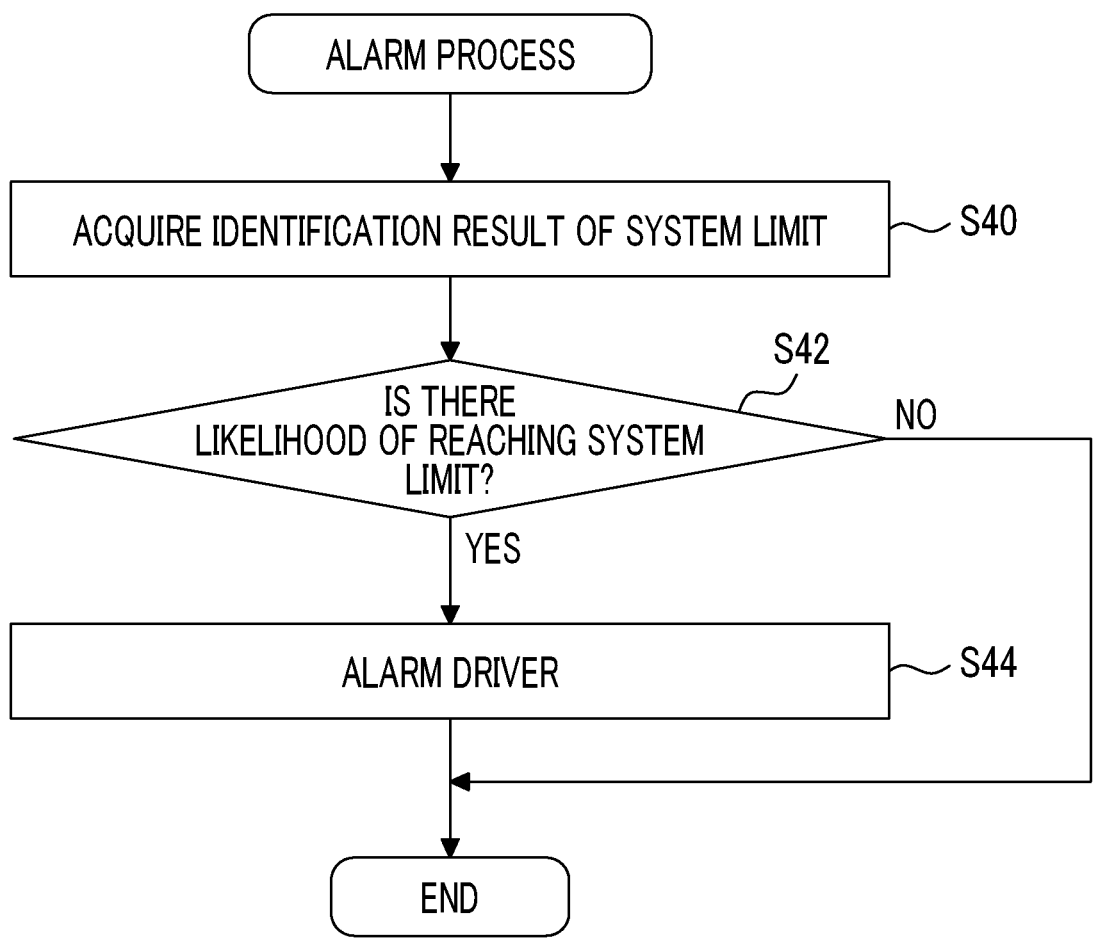
FIG. 13 is a flowchart showing an alarm process by the alarm controller according to the embodiment 2.

FIG. 12 is a block diagram showing a function configuration of the alarm controller according to the embodiment 2. The alarm controller 140 includes an identification result acquisition unit 141, an identification result determination unit 142, and an alarm unit 143. FIG. 13 is a flowchart showing the alarm process by the alarm controller according to the embodiment 2. The alarm process by the alarm controller 140 according to the embodiment 2 will be described with reference to FIGS. 12 and 13.

As shown in FIGS. 12 and 13, first, the identification result acquisition unit 141 acquires an identification result 94 from the system limit identification unit 130 (step S40). Here, the identification result 94 is the probability of reaching the system limit. The identification result acquisition unit 141 outputs the acquired identification result 94 to the identification result determination unit 142.

In the next step, the identification result determination unit 142 determines the likelihood of reaching the system limit (step S42). Here, specifically, the identification result determination unit 142 determines whether the identification result 94 is larger than the predetermined threshold value. The threshold value herein is a threshold value for determining whether the system limit is reached and is stored in a memory in advance. As a result of the determination, when the establishment of the determination is not approved, a determination is made that the system limit is not reached, and the routine ends. On the other hand, when the establishment of the determination is approved, a determination is made that the system limit is reached, and the routine proceeds to the next step.

In the next step, the alarm unit 143 alarms the driver (step S44). Here, specifically, the alarm unit 143 alarms the driver that the system limit is reached by a sound. With the alarm process as described above, the driver is alarmed that the system limit is reached in advance. Accordingly, it is possible to ensure a time for the driver to recognize a situation and to recognize and determine the driving switching or the like.

2-2. Modification Example of Embodiment 2

The alarm unit 143 may use other means capable of alarming the driver. Example of the means as described above is a warning sound or a message sound, a display on a dashboard, a liquid crystal screen, or the like, means for vibrating a seat or the like, or a combination of the means.

Embodiment 3

A driving assistance control system according to an embodiment 3 will be described.

3-1. Feature of Embodiment 3

A driving assistance control system 100 according to the embodiment 3 has a feature of an instruction value correction process of correcting the instruction value of the vehicle control amount according to the probability of reaching the system limit in order to suppress that the system limit is reached in the path following control. Hereinafter, the instruction value correction process in the path following control according to the embodiment 3 will be described in more detail.

Figure 14:
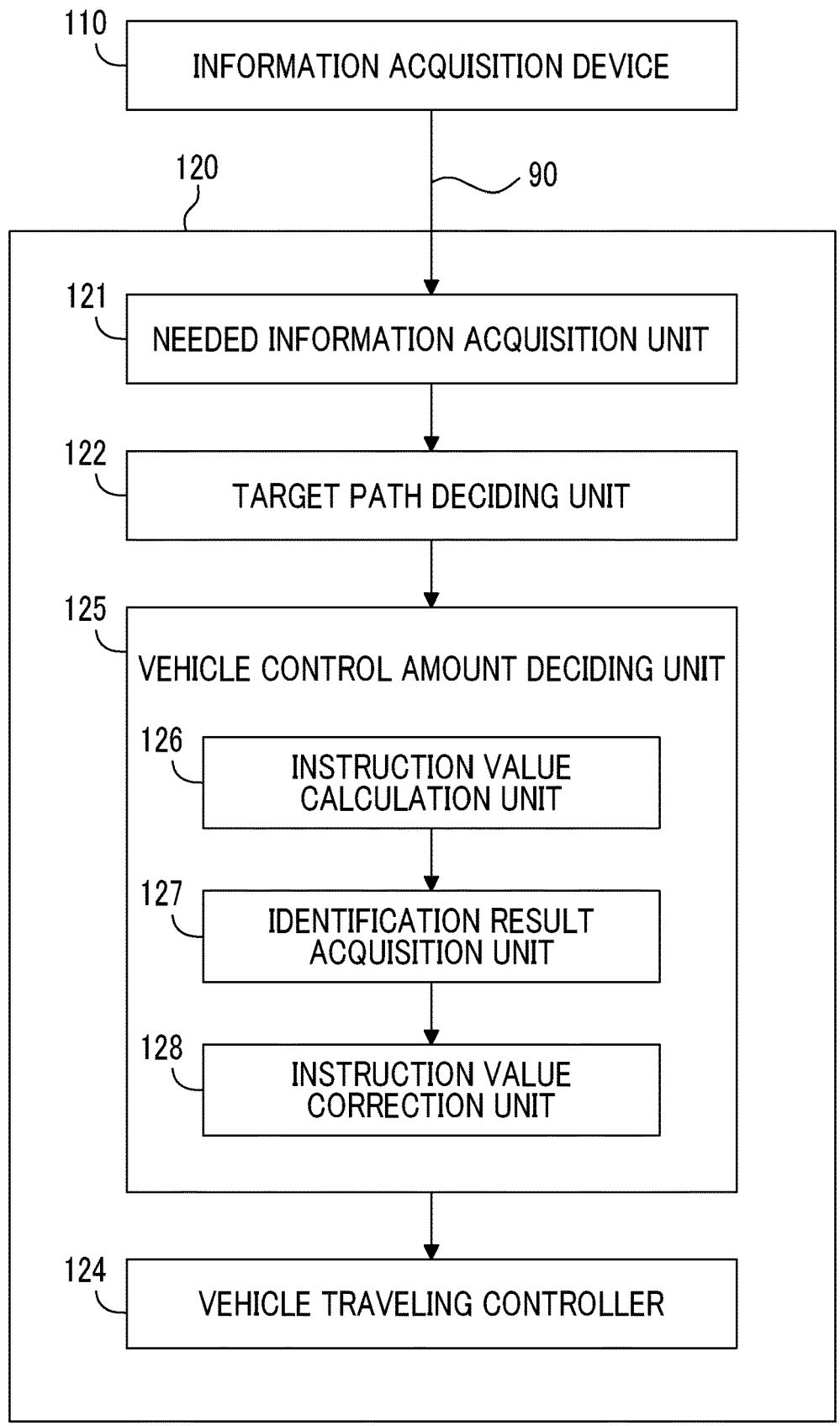
FIG. 14 is a block diagram showing a function configuration of a path following control device according to an embodiment 3.

FIG. 14 is a block diagram showing a function configuration of a path following control device according to the embodiment 3. The path following control device 120 includes the needed information acquisition unit 121, the target path deciding unit 122, a vehicle control amount deciding unit 125, and the vehicle traveling controller 124. The vehicle control amount deciding unit 125 includes an instruction value calculation unit 126, an identification result acquisition unit 127, and an instruction value correction unit 128.

Figure 15:
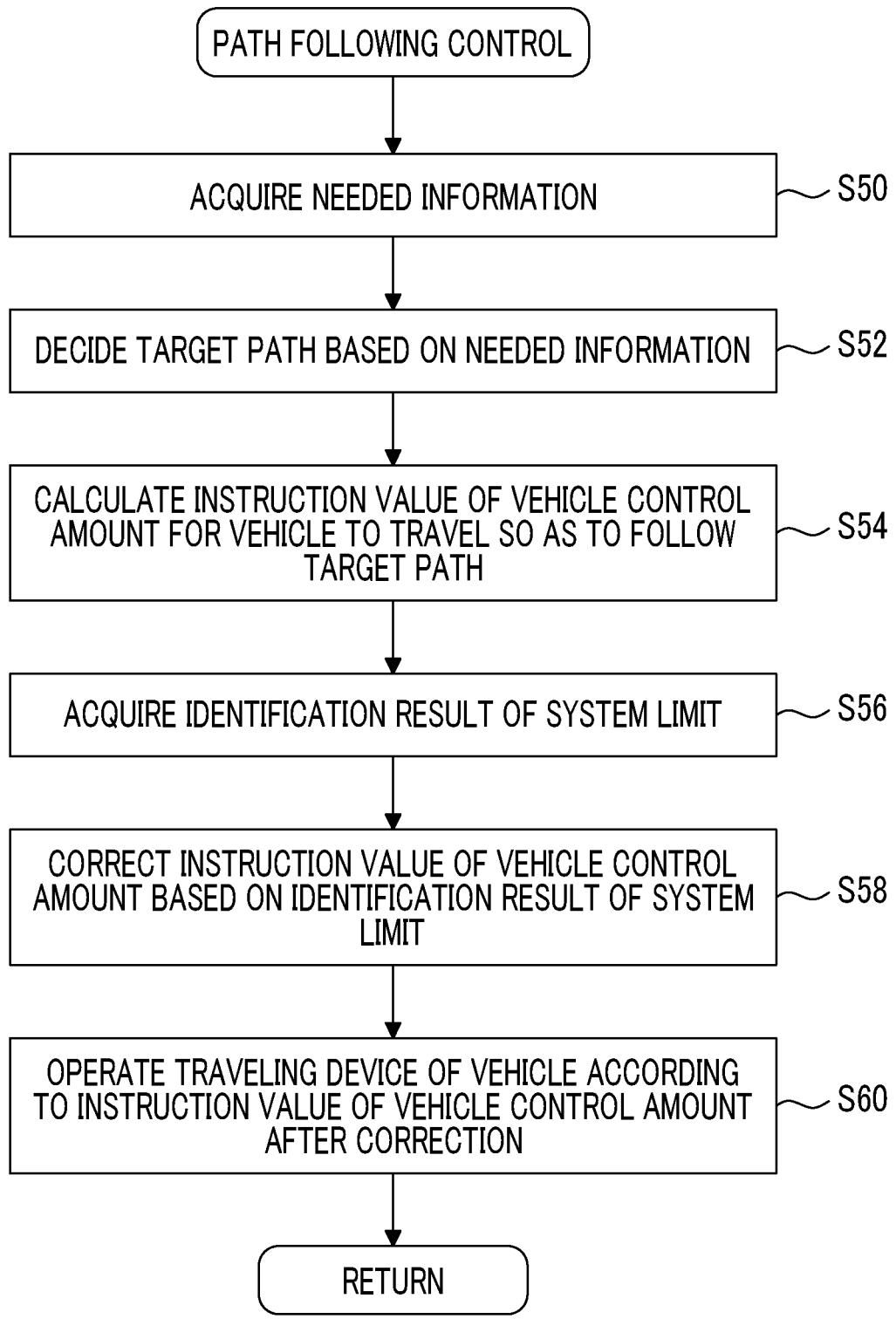
FIG. 15 is a flowchart showing a path following control by the path following control device according to the embodiment 3.

FIG. 15 is a flowchart showing the path following control by the path following control device according to the embodiment 3. The path following control by the path following control device 120 according to the embodiment 3 will be described with reference to FIGS. 14 and 15.

In steps S50 and S52 shown in FIG. 15, the same processes as the processes in steps S10 and S12 described above are performed. The target path deciding unit 122 outputs the decided target path to the vehicle control amount deciding unit 125.

The instruction value calculation unit 126 of the vehicle control amount deciding unit 125 calculates the instruction value of the vehicle control amount for the vehicle to travel so as to follow the target path (step S54). For example, the instruction value calculation unit 126 calculates the steering angle instruction value, the vehicle speed instruction value, or the like for reducing the deviation between the vehicle and the target path based on parameters such as the lateral deviation, the orientation angle difference, and the curvature of the target path. The instruction value calculation unit 126 outputs the calculated instruction value to the instruction value correction unit 128.

The identification result acquisition unit 127 of the vehicle control amount deciding unit 125 acquires the identification result 94 from the system limit identification unit 130 (step S56). Here, the identification result 94 is the probability of reaching the system limit. The identification result acquisition unit 127 outputs the acquired identification result 94 to the instruction value correction unit 128.

In the next step, the instruction value correction unit 128 corrects the instruction value of the vehicle control amount based on the identification result 94 of the system limit (step S58). Here, the instruction value is corrected such that vehicle control performance in the path following control is suppressed as the probability of reaching the system limit included in the identification result 94 is higher. Here, control performance suppression of the vehicle refers to suppressing the vehicle speed, suppressing the lateral acceleration, suppressing a steering angle speed, suppressing a change in the vehicle speed, and a combination of the above. For example, when the vehicle speed is suppressed as an example of the control performance suppression, the instruction value correction unit 128 calculates a target vehicle speed based on the reaching probability. The instruction value correction unit 128 calculates the instruction value of the vehicle control amount for realizing the target vehicle speed. Each instruction value after the correction is output to the vehicle traveling controller 124.

The vehicle traveling controller 124 operates the traveling device 60 according to the instruction value of the vehicle control amount after the correction output from the instruction value correction unit 128 (step S60). The path following control in which reaching the system limit is suppressed is realized as described above.

As described above, with the driving assistance control system 100 according to the embodiment 3, it is possible to suppress the vehicle control performance in the path following control according to a sign of reaching the system limit. Accordingly, it is possible to effectively suppress that the system limit is reached. With the driving assistance control system 100 according to the embodiment 3, since the vehicle control performance in the path following control is not suppressed when the probability of reaching the system limit becomes low, the vehicle control performance can return quickly from a suppressed state.

3-2. Modification Example of Embodiment 3

The driving assistance control system 100 according to the embodiment 3 may be configured as a modified system as described below.

The configuration of the alarm controller 140 included in the driving assistance control system 100 according to the embodiment 2 may be further included. In the configuration as described above, the instruction value correction process in the path following control may be implemented solely when the driver is alarmed in advance that the system limit is reached and there is no response from the driver.

When the probability of reaching the system limit included in the identification result 94 is higher than a predetermined probability, the instruction value correction unit 128 may correct the instruction value of the vehicle control amount.

Embodiment 4

A driving assistance control system according to an embodiment 4 will be described.

4-1. Feature of Embodiment 4

A driving assistance control system 100 according to the embodiment 4 has a feature of a target path correction process of correcting the target path according to the probability of reaching the system limit in order to suppress that the system limit is reached in the path following control. Hereinafter, the target path correction process in the path following control according to the embodiment 4 will be described in more detail.

Figure 16:
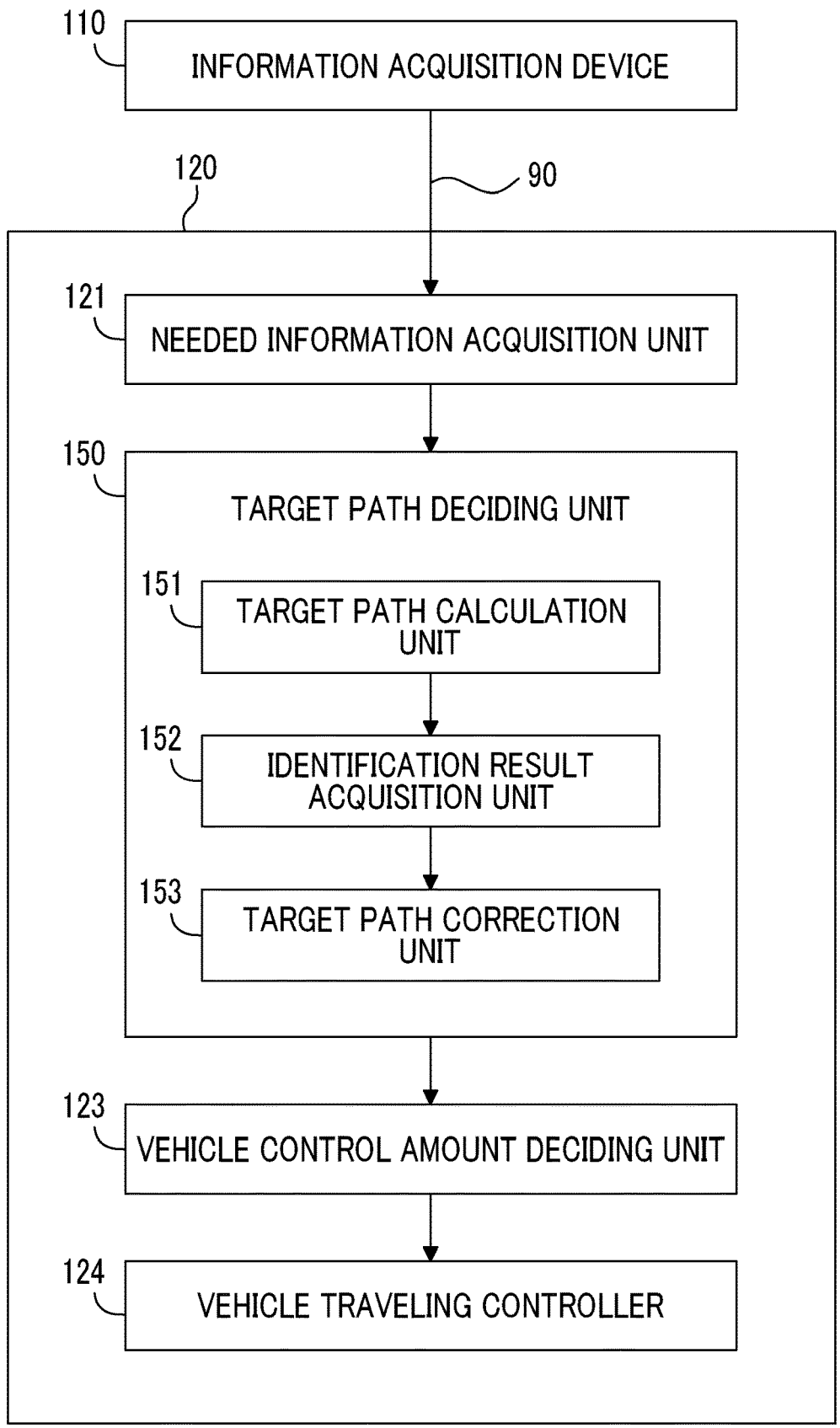
FIG. 16 is a block diagram showing a function configuration of a path following control device according to an embodiment 4.

FIG. 16 is a block diagram showing a function configuration of a path following control device according to the embodiment 4. The path following control device 120 includes the needed information acquisition unit 121, a target path deciding unit 150, the vehicle control amount deciding unit 123, and the vehicle traveling controller 124. The target path deciding unit 150 includes a target path calculation unit 151, an identification result acquisition unit 152, and a target path correction unit 153.

Figure 17:
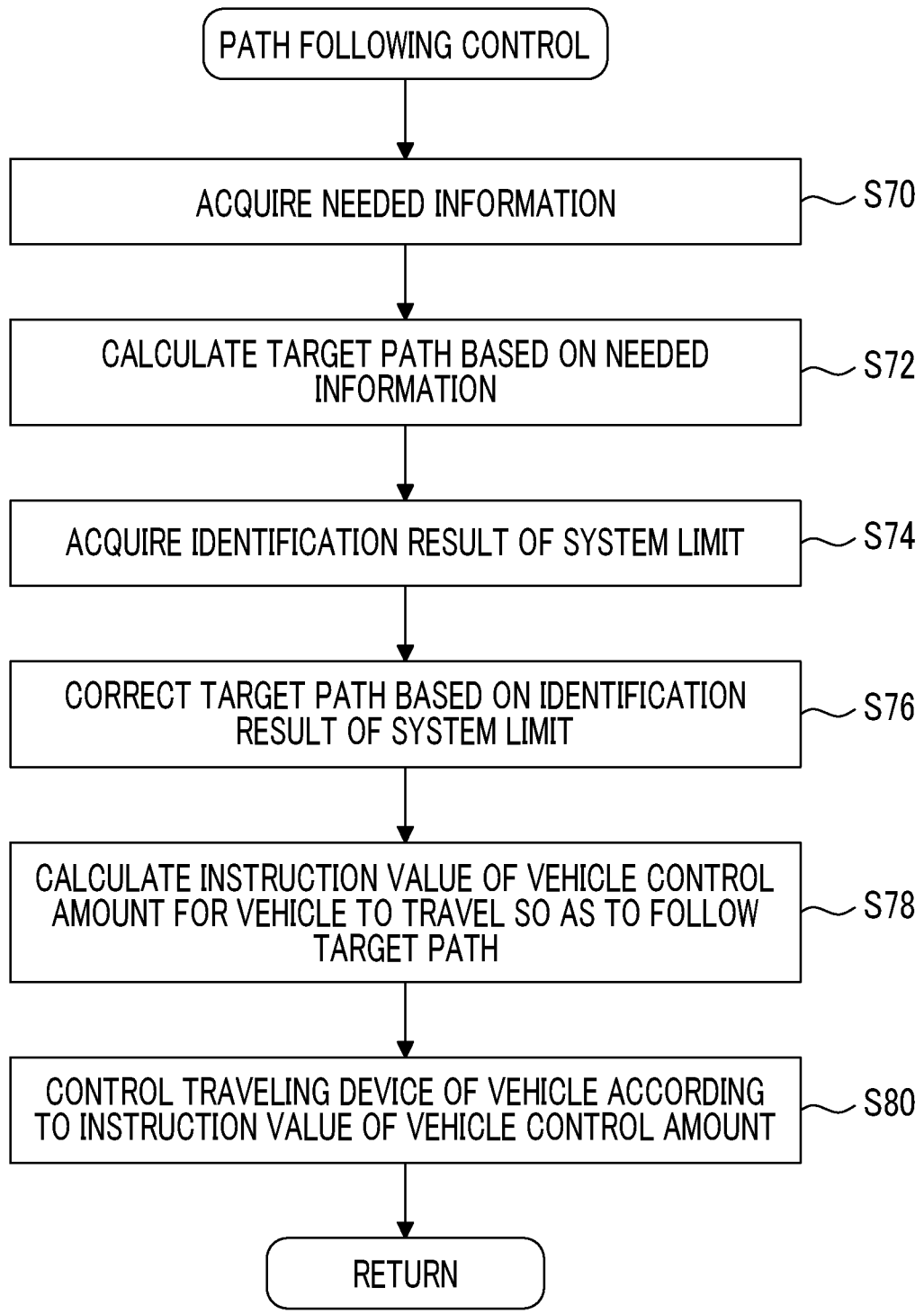
FIG. 17 is a flowchart showing a path following control by the path following control device according to the embodiment 4.

FIG. 17 is a flowchart showing the path following control by the path following control device according to the embodiment 4. The path following control by the path following control device 120 according to the embodiment 4 will be described with reference to FIGS. 16 and 17.

In step S70 shown in FIG. 17, the same process as the process in step S10 described above is performed. The needed information acquisition unit 121 periodically acquires the needed information 90 and outputs the acquired information to the target path calculation unit 151 of the target path deciding unit 150.

The target path calculation unit 151 of the target path deciding unit 150 calculates the target path based on the needed information 90 acquired in step S70 (step S72). Here, the same process as the process in step S12 described above is executed. The target path calculation unit 151 outputs the calculated target path to the target path correction unit 153.

The identification result acquisition unit 152 of the target path deciding unit 150 acquires the identification result 94 from the system limit identification unit 130 (step S74). The identification result 94 herein is the probability of reaching the system limit. The identification result acquisition unit 152 outputs the acquired identification result 94 to the target path correction unit 153.

In the next step, the target path correction unit 153 corrects the target path based on the identification result 94 (step S76). Here, the target path is corrected such that vehicle control performance in the path following control is suppressed as the probability of reaching the system limit included in the identification result 94 is higher. Here, the control performance suppression of the vehicle refers to suppressing the vehicle speed, suppressing the lateral acceleration, suppressing the steering angle speed, suppressing the change in the vehicle speed, and the combination of the above. For example, when the vehicle speed is suppressed as the example of the control performance suppression, the target path is corrected to a side approaching the vehicle in a front-rear direction of the vehicle. The target path after the correction is output to the vehicle control amount deciding unit 123.

The vehicle control amount deciding unit 123 calculates the instruction value of the vehicle control amount for the vehicle to travel so as to follow the target path after the correction (step S78). Here, specifically, the same process as the process in step S14 is executed. The vehicle control amount deciding unit 123 outputs the decided instruction value to the vehicle traveling controller 124.

The vehicle traveling controller 124 operates the traveling device 60 according to the instruction value of the vehicle control amount output from the vehicle control amount deciding unit 123 (step S80). Here, specifically, the same process as the process in step S16 is executed. The path following control in which reaching the system limit is suppressed is realized as described above.

As described above, with the driving assistance control system 100 according to the embodiment 4, it is possible to suppress the vehicle control performance in the path following control according to the sign of reaching the system limit. Accordingly, it is possible to effectively suppress that the system limit is reached. With the driving assistance control system 100 according to the embodiment 4, since the vehicle control performance in the path following control is not suppressed when the probability of reaching the system limit becomes low, the vehicle control performance can return quickly from the suppressed state.

4-2. Modification Example of Embodiment 4

The driving assistance control system 100 according to the embodiment 4 may be configured as a modified system as described below.

The configuration of the alarm controller 140 included in the driving assistance control system 100 according to the embodiment 2 may be further included. In the configuration as described above, the target path correction process in the path following control may be implemented solely when the driver is alarmed in advance that the system limit is reached and there is no response from the driver.

When the probability of reaching the system limit included in the identification result 94 is higher than the predetermined probability, the target path correction unit 153 may correct the target path.

Embodiment 5

A driving assistance control system according to the embodiment 5 will be described.

5-1. Feature of Embodiment 5

During the execution of the path following control, when the likelihood of reaching the system limit is in a high state continuously, there is a high possibility that the vehicle cannot follow the target path. The driving assistance control system 100 according to the embodiment 5 has a feature of a control end determination process of ending the path following control when the system limit is continuously predicted to be reached over a long time. A control end determination unit 160 performs the control end determination process as a part of the driving assistance control system 100. Hereinafter, the control end determination process according to the embodiment 5 will be described in more detail.

Figure 18:
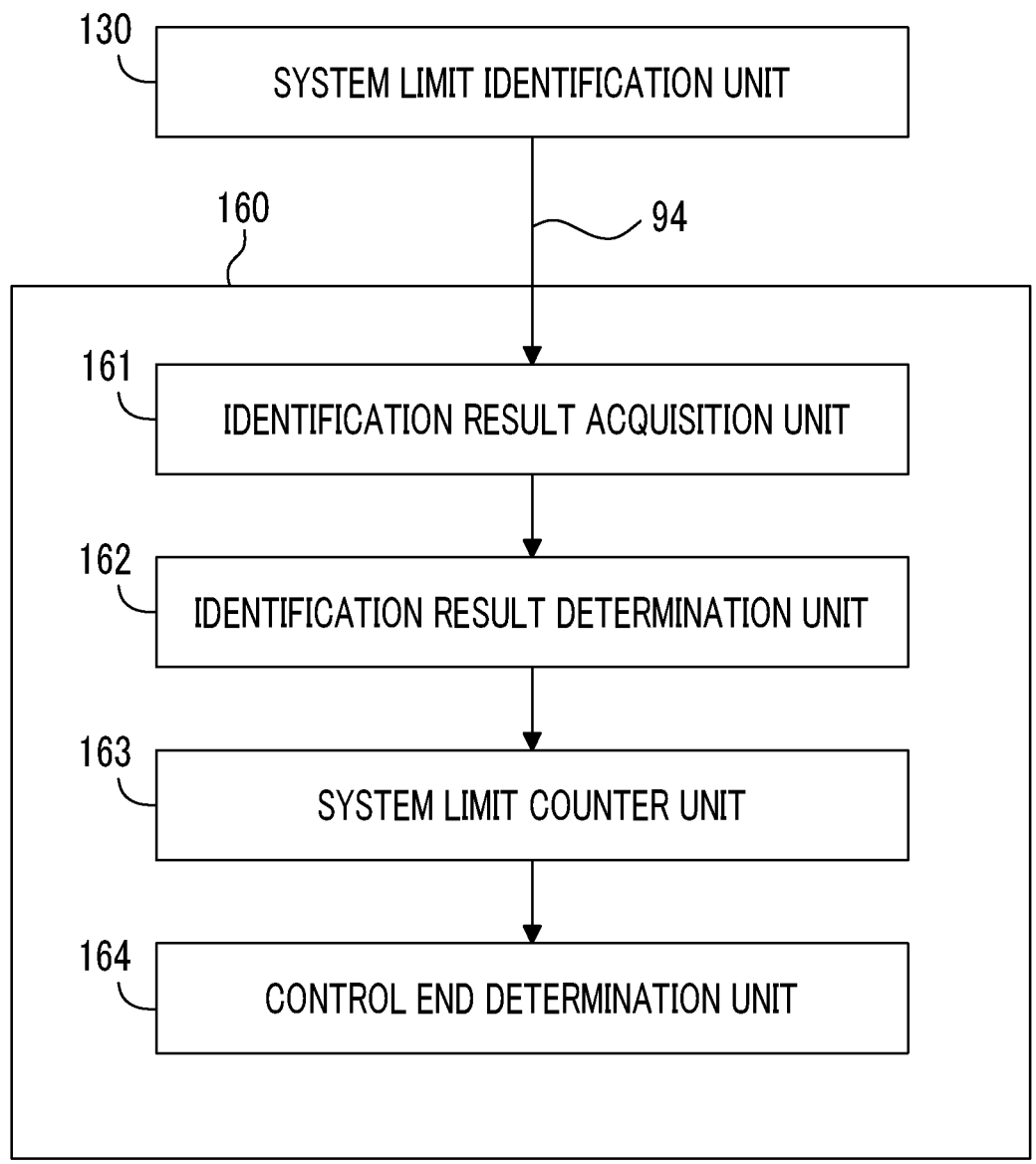
FIG. 18 is a block diagram showing a function configuration of a control end determination unit according to an embodiment 5.

FIG. 18 is a block diagram showing a function configuration of the control end determination unit according to the embodiment 5. The control end determination unit 160 includes an identification result acquisition unit 161, an identification result determination unit 162, a system limit counter unit 163, and a control end determination unit 164.

Figure 19:
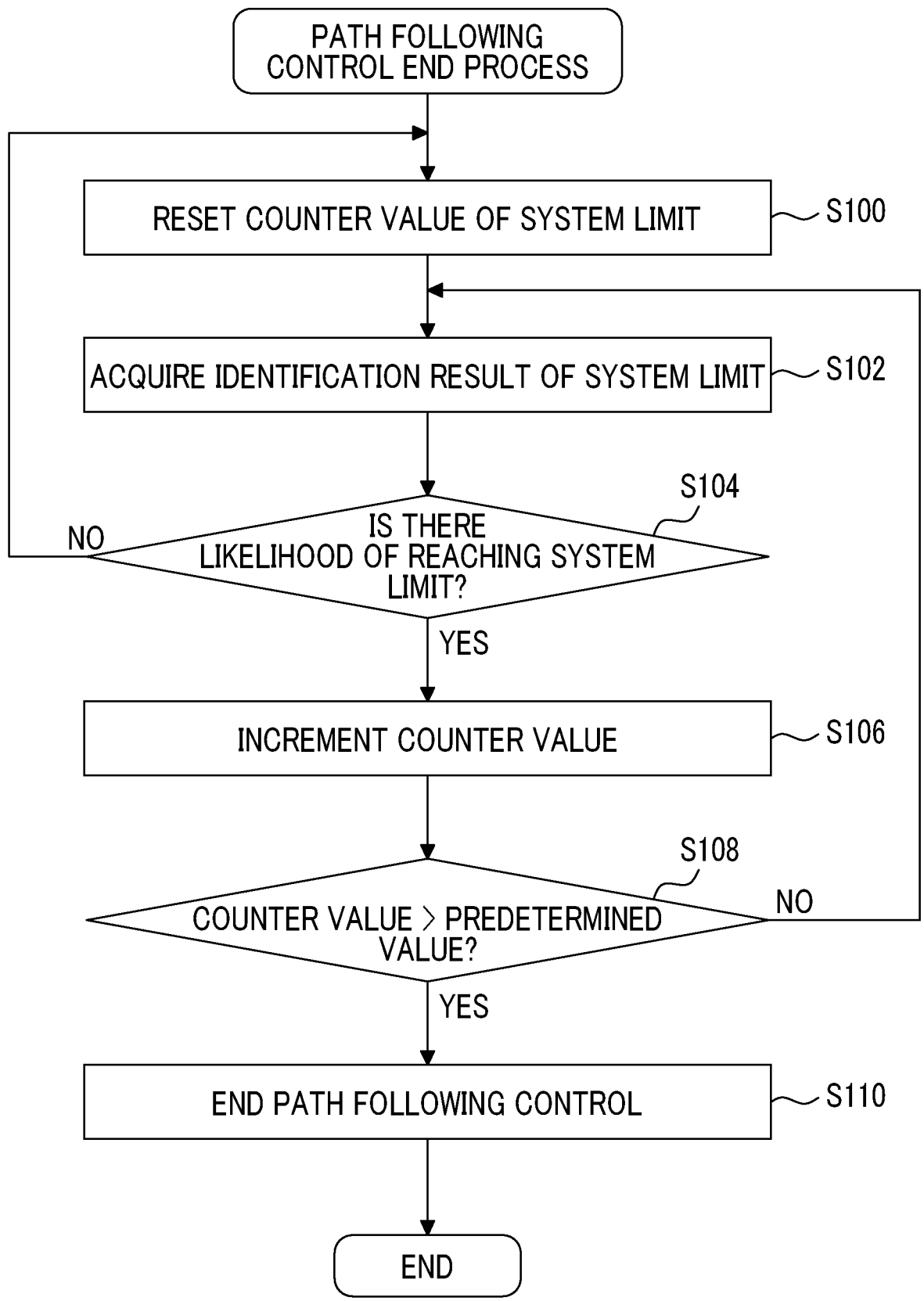
FIG. 19 is a flowchart showing a control end determination process by the control end determination unit according to the embodiment 5.

FIG. 19 is a flowchart showing the control end determination process by the control end determination unit according to the embodiment 5. The control end determination process by the control end determination unit 160 according to the embodiment 5 will be described with reference to FIGS. 18 and 19. A routine of the control end determination process shown in FIG. 19 is started while the driving assistance control system 100 executes the path following control.

As shown in FIGS. 18 and 19, first, the system limit counter unit 163 resets a counter value of a system limit counter to zero (step S100). The system limit counter is a counter for counting a continuation time that the system limit is reached. Next, the identification result acquisition unit 161 acquires the identification result 94 from the system limit identification unit 130 (step S102). The identification result 94 herein is the probability of reaching the system limit. The identification result acquisition unit 161 outputs the acquired identification result 94 to the identification result determination unit 162.

In the next step, the identification result determination unit 162 determines the likelihood of reaching the system limit (step S104). Here, specifically, the identification result determination unit 162 determines whether the identification result 94 is larger than the predetermined threshold value. As a result of the determination, when the establishment of the determination is not approved, the likelihood of reaching the system limit is determined to be low and the process returns to step S100 again. On the other hand, when the establishment of the determination is approved, the likelihood of reaching the system limit is determined to be high and the process proceeds to the next step.

In the next step, the system limit counter unit 163 increments the counter value of the system limit counter by +1 (step S106). The system limit counter unit 163 outputs a current counter value to the control end determination unit 164.

The control end determination unit 164 determines whether the counter value input from the system limit counter unit 163 is larger than a predetermined value (step S108). The predetermined value herein is a value corresponding to an upper limit value of the continuation time of a determination that the system limit is reached, and is a value set in advance based on a viewpoint of safety or the like. As a result, when the establishment of the determination is not approved, it is possible to determine that the continuation time of the determination that the system limit is reached is not attained the limit. In the case described above, the process returns to step S102. On the other hand, when the establishment of the determination in step S108 is approved, it is possible to determine that the continuation time of the determination that the system limit is reached is attained the limit. In the case described above, the control end determination unit 164 performs a process for ending the path following control (step S110).

As described above, with the control end determination process as described above, the path following control is ended when the determination that the system limit is reached continues for a long period during the execution of the path following control. Accordingly, it is possible to switch the driving to the driver in a safer state.

5-2. Modification Example of Embodiment 5

The driving assistance control system 100 according to the embodiment 5 may be configured as a modified system as described below.

The driving assistance control system 100 according to the embodiment 5 may be configured as a system combined with the driving assistance control system 100 of any of the embodiments 1 to 4.

Embodiment 6

Next, a driving assistance control system according to the embodiment 6 will be described.

6-1. Feature of Embodiment 6

The driving assistance control system 100 according to the embodiment 6 has a feature of a determination model update process of accumulating the vehicle data during the execution of the path following control and of updating the determination model 732 based on the accumulated vehicle data. A determination model update process unit 170 performs the determination model update process as a part of the driving assistance control system 100. Hereinafter, the determination model update process according to the embodiment 6 will be described in more detail.

Figure 20:
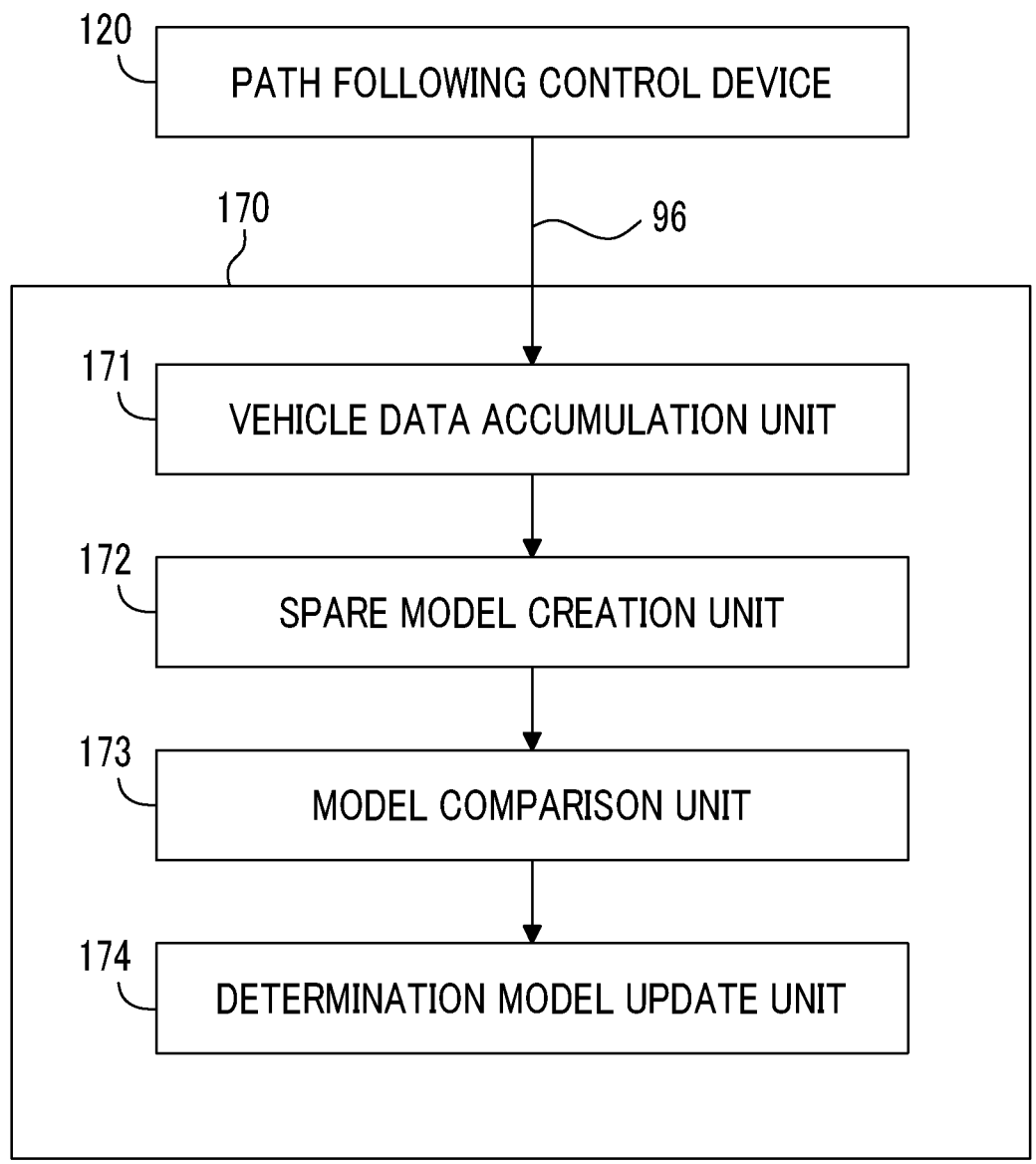
FIG. 20 is a block diagram showing a function configuration of a determination model update process unit according to an embodiment 6.

FIG. 20 is a block diagram showing a function configuration of the determination model update process unit according to the embodiment 6. The determination model update process unit 170 includes a vehicle data accumulation unit 171, a spare model creation unit 172, a model comparison unit 173, and a determination model update unit 174. The determination model update process unit 170 herein is assumed to be configured inside the management server communicable with the vehicle. However, the determination model update process unit 170 may be configured inside the control device 70 mounted on the vehicle or a spare control device different from the control device 70.

FIG. 21 is a flowchart showing the determination model update process by the determination model update process unit according to the embodiment 6. The determination model update process by the determination model update process unit 170 according to the embodiment 6 will be described with reference to FIGS. 20 and 21.

The vehicle data accumulation unit 171 acquires and accumulates past data 96 from the path following control device 120 (step S120). The past data 96 is an actual value of the vehicle data during the execution of the path following control, and examples of the past data 96 are the lateral deviation between the vehicle and the target path, the steering angle, the vehicle speed, the vehicle yaw rate, the front-rear acceleration, the lateral acceleration, the steering angle instruction value, the vehicle speed instruction value, the vehicle yaw rate instruction value, the front-rear acceleration instruction value, and the lateral acceleration instruction value. The vehicle data accumulation unit 171 accumulates a certain level or more pieces of past data 96 and then outputs the pieces of past data 96 to the spare model creation unit 172.

The spare model creation unit 172 implements the machine learning using the pieces of past data 96 to create a spare model (step S122). Here, the same processes as the processes in steps S4 to S8 are performed to create the spare model of the determination model.

The model comparison unit 173 compares a correct answer rate of the spare model with the correct answer rate of the current determination model 732 using the test data (step S124). For example, when the correct answer rate of the spare model is higher than the correct answer rate of the current determination model 732, the model comparison unit 173 outputs a comparison result indicating that the update of the determination model 732 is needed to the determination model update unit 174. When the correct answer rate of the spare model is equal to or less than the correct answer rate of the current determination model 732, the model comparison unit 173 outputs a comparison result indicating that the update of the determination model 732 is not needed to the determination model update unit 174.

The determination model update unit 174 updates the determination model 732 based on the comparison result (step S126). Specifically, when the comparison result indicating that the update of the determination model 732 is needed is received, the determination model update unit 174 updates the determination model 732 with the spare model.

With the determination model update process described above, it is possible to perform the determination that the system limit is reached with high accuracy according to a change in an external environment or the like due to aged deterioration of the vehicle or a seasonal change.

6-2. Modification Example of Embodiment 6

The driving assistance control system 100 according to the embodiment 6 may be configured as a modified system as described below.

When the correct answer rate of the spare model is higher than the correct answer rate of the current determination model 732 by a certain level or more, the model comparison unit 173 may output the comparison result indicating that the update of the determination model 732 is needed to the determination model update unit 174. With the configuration as described above, it is possible to suppress that an update process of the determination model 732 is complicatedly performed.

What is claimed is:

1. A driving assistance control system of a vehicle, the driving assistance control system comprising:
   one or more processors configured to:
      perform vehicle path following control that controls the vehicle to follow a target vehicle path;
      acquire a vehicle feature amount of the vehicle related to the target vehicle path;
      perform control so that the vehicle feature amount is input into a trained neural network model;
      identify a likelihood of reaching a system limit at which the vehicle path following control for the target vehicle path becomes unsuccessful using an output result of the inputting of the vehicle feature amount into the trained neural network model, wherein the trained neural network model is configured to learn a relationship between a plurality of vehicle feature amounts related to the vehicle path following control and the likelihood of reaching the system limit related to the target vehicle path by machine learning in advance;
      output an identification result of the likelihood of reaching the system limit corresponding to the input vehicle feature amounts; and
      end the vehicle path following control based on the identification result exceeding a predetermined threshold value for a certain period of time.

2. The driving assistance control system according to claim 1, wherein the one or more processors is further configured to:
   calculate an instruction value to transmit to a traveling device of the vehicle for the vehicle to follow the target vehicle path; and correct the instruction value according to the identification result.

3. The driving assistance control system according to claim 1, wherein the one or more processors is further configured to:
calculate the target vehicle path based on the vehicle feature amount; and
correct the target vehicle path according to the identification result.

4. The driving assistance control system according to claim 1, wherein the one or more processors is further configured to: alarm a driver when the identification result exceeds the predetermined threshold value.

5. The driving assistance control system according to claim 1, wherein the one or more processors is further configured to:
accumulate past data of the vehicle feature amount over time;
create a spare model of the trained neural network model by machine learning a relationship between the past data and the likelihood of reaching the system limit;
compare a correct answer rate of an identification result by the trained neural network model with a correct answer rate of an identification result by the spare model using test data; and
update the trained neural network model with the spare model when the correct answer rate of the spare model is higher than the correct answer rate of the trained neural network model by a certain level or more.

6. The driving assistance control system according to claim 1, wherein the one or more processors is further configured to output the identification result when a predetermined confirmation condition is established.

7. The driving assistance control system according to claim 1, wherein the vehicle feature amount includes at least one of: a lateral deviation between the vehicle and the target vehicle path, a steering angle, a vehicle speed, a vehicle yaw rate, a front-rear acceleration, a lateral acceleration, a steering angle instruction value, a vehicle speed instruction value, a vehicle yaw rate instruction value, a front-rear acceleration instruction value, a lateral acceleration instruction value, or a deviation between an instruction value and a sensor value.

8. The driving assistance control system according to claim 7, wherein a probability of departing from a lane corresponds to the probability of reaching the system limit.

9. The driving assistance control system according to claim 7, wherein the system limit includes a vehicle limit event, wherein the vehicle limit event includes one or more of the following events occurring: the vehicle departs from a lane, the vehicle separates a certain level or more from a vehicle target path, a vehicle speed separates a certain level or more from a target speed, the vehicle approaches a certain level or more from a white line or a boundary of a travelable area, or a sensor value of a yaw angle separates a certain level or more from a target value.

10. The driving assistance control system according to claim 1, wherein a probability of departing from a lane corresponds to the probability of reaching the system limit.

11. The driving assistance control system according to claim 1, wherein the system limit includes a vehicle limit event, wherein the vehicle limit event includes one or more of the following events occurring: the vehicle departs from a lane, the vehicle separates a certain level or more from a vehicle target path, a vehicle speed separates a certain level or more from a target speed, the vehicle approaches a certain level or more from a white line or a boundary of a travelable area, or a sensor value of a yaw angle separates a certain level or more from a target value.

12. A driving assistance control method of a vehicle, the driving assistance control method comprising:
performing vehicle path following control that controls the vehicle to follow a target vehicle path;
acquiring a vehicle feature amount of the vehicle related to the vehicle path following control;
performing control so that the vehicle feature amount is input into a trained neural network model;
identifying a likelihood of reaching a system limit at which the vehicle path following control for the target vehicle path becomes unsuccessful using an output result of the inputting of the vehicle feature amount into the trained neural network model, wherein the trained neural network model is configured to learn a relationship between a plurality of vehicle feature amounts related to the vehicle path following control and the likelihood of reaching the system limit related to the target vehicle path by machine learning in advance;
output an identification result of the likelihood of reaching the system limit corresponding to the input vehicle feature amounts; and
ending the vehicle path following control based on the identification result exceeding a predetermined threshold value for a preset period of time.

13. The driving assistance control method according to claim 12, wherein the vehicle feature amount includes at least one of: a lateral deviation between the vehicle and the target vehicle path, a steering angle, a vehicle speed, a vehicle yaw rate, a front-rear acceleration, a lateral acceleration, a steering angle instruction value, a vehicle speed instruction value, a vehicle yaw rate instruction value, a front-rear acceleration instruction value, a lateral acceleration instruction value, or a deviation between an instruction value and a sensor value.

14. The driving assistance control method according to claim 13, wherein a probability of departing from a lane corresponds to the probability of reaching the system limit.

15. The driving assistance control method according to claim 13, wherein the system limit includes a vehicle limit event, wherein the vehicle limit event includes one or more of the following events occurring: the vehicle departs from a lane, the vehicle separates a certain level or more from a vehicle target path, a vehicle speed separates a certain level or more from a target speed, the vehicle approaches a certain level or more from a white line or a boundary of a travelable area, or a sensor value of a yaw angle separates a certain level or more from a target value.

16. The driving assistance control method according to claim 12, wherein a probability of departing from a lane corresponds to the probability of reaching the system limit.

17. The driving assistance control method according to claim 12, wherein the system limit includes a vehicle limit event, wherein the vehicle limit event includes one or more of the following events occurring: the vehicle departs from a lane, the vehicle separates a certain level or more from a vehicle target path, a vehicle speed separates a certain level or more from a target speed, the vehicle approaches a certain level or more from a white line or a boundary of a travelable area, or a sensor value of a yaw angle separates a certain level or more from a target value.

* * * * *

UNITED STATES PATENT AND TRADEMARK OFFICE
CERTIFICATE OF CORRECTION

PATENT NO. : 11,117,575 B2  
APPLICATION NO. : 16/167660  
DATED : September 14, 2021  
INVENTOR(S) : Irie et al.

Page 1 of 1

It is certified that error appears in the above-identified patent and that said Letters Patent is hereby corrected as shown below:

On the Title Page

Delete "(71) Applicants: "TOYOTA JIDOSHA KABUSHIKI KAISHA, Toyota (JP); DENSO CORPORATION, Karriya (JP)"

Insert -- (71) Applicants: TOYOTA JIDOSHA KABUSHIKI KAISHA, Toyota (JP); DENSO CORPORATION, Kariya (JP) --

Signed and Sealed this  
Twenty-second Day of February, 2022

Drew Hirshfeld  
*Performing the Functions and Duties of the  
Under Secretary of Commerce for Intellectual Property and  
Director of the United States Patent and Trademark Office*